United States Patent
Simmons et al.

(10) Patent No.: US 11,859,818 B2
(45) Date of Patent: Jan. 2, 2024

(54) SYSTEMS AND METHODS FOR VARIABLE MICROCHANNEL COMBUSTOR LINER COOLING

(71) Applicant: General Electric Company, Schenectady, NY (US)

(72) Inventors: Scott Robert Simmons, Greenville, SC (US); Ronald James Chila, Greenfield Center, NY (US)

(73) Assignee: General Electric Company, Schenectady, NY (US)

( * ) Notice: Subject to any disclaimer, the term of this patent is extended or adjusted under 35 U.S.C. 154(b) by 215 days.

(21) Appl. No.: 16/285,186

(22) Filed: Feb. 25, 2019

(65) Prior Publication Data

US 2020/0271317 A1   Aug. 27, 2020

(51) Int. Cl.
   | | |
   |---|---|
   | F23R 3/00 | (2006.01) |
   | F23M 5/08 | (2006.01) |
   | F02C 3/04 | (2006.01) |

(52) U.S. Cl.
   CPC ........... *F23R 3/002* (2013.01); *F23R 3/005* (2013.01); *F02C 3/04* (2013.01); *F05D 2240/35* (2013.01); *F05D 2260/2214* (2013.01); *F23M 5/085* (2013.01); *F23R 2900/03043* (2013.01)

(58) Field of Classification Search
   None
   See application file for complete search history.

(56) References Cited

U.S. PATENT DOCUMENTS

| | | | |
|---|---|---|---|
| 4,719,748 A * | 1/1988 | Davis, Jr. | F23R 3/002 60/758 |
| 5,329,773 A * | 7/1994 | Myers | F23R 3/08 60/757 |
| 5,724,816 A * | 3/1998 | Ritter | B23P 11/025 60/752 |
| 6,334,310 B1 * | 1/2002 | Sutcu | F01D 9/023 228/164 |
| 8,307,657 B2 | 11/2012 | Chila | |
| 8,499,566 B2 | 8/2013 | Lacy et al. | |
| 8,813,501 B2 | 8/2014 | Cihlar et al. | |
| 9,126,279 B2 | 9/2015 | Schick et al. | |
| 9,222,672 B2 | 12/2015 | Kodukulla et al. | |
| 10,247,419 B2 | 4/2019 | Slavens et al. | |
| 10,520,193 B2 | 12/2019 | Berry | |
| 10,571,957 B2 | 2/2020 | Mathew et al. | |

(Continued)

OTHER PUBLICATIONS

U.S. Appl. No. 16/146,388, filed Sep. 28, 2018, Scott Robert Simmons.

*Primary Examiner* — Edwin Kang
(74) *Attorney, Agent, or Firm* — Fletcher Yoder, P.C.

(57) ABSTRACT

In accordance with an embodiment of the disclosure, a system includes a combustor liner disposed about a combustion chamber of a combustor of a gas turbine system. The combustor liner includes an inner wall portion exposed to the combustion chamber, an outer wall portion disposed about the inner wall portion, and multiple channels between the inner and outer wall portions of the combustor liner. Each channel of the multiple channels is configured to direct a coolant along the combustor liner to convectively cool the combustor liner, and each channel of the multiple channels includes a cross-sectional area that progressively changes along a length of each channel of the plurality of channels.

16 Claims, 12 Drawing Sheets

(56) References Cited

U.S. PATENT DOCUMENTS

| | | | |
|---|---|---|---|
| 10,684,016 B2 | 6/2020 | Simmons et al. | |
| 10,718,224 B2 | 7/2020 | Davis, III et al. | |
| 2005/0268615 A1* | 12/2005 | Bunker | F23R 3/002 60/772 |
| 2006/0010874 A1* | 1/2006 | Intile | F23R 3/002 60/752 |
| 2009/0120093 A1* | 5/2009 | Johnson | F01D 9/023 60/752 |
| 2009/0120096 A1* | 5/2009 | Tuthill | F23R 3/002 60/755 |
| 2010/0003128 A1* | 1/2010 | Chila | F01D 25/12 415/182.1 |
| 2010/0034643 A1* | 2/2010 | Davis, Jr. | F01D 9/023 415/144 |
| 2010/0170259 A1* | 7/2010 | Huffman | F01D 9/023 60/755 |
| 2011/0120135 A1* | 5/2011 | Johnson | F23D 14/62 60/772 |
| 2011/0239654 A1* | 10/2011 | Bland | F23R 3/002 60/752 |
| 2011/0247341 A1* | 10/2011 | McMahan | F23R 3/002 60/757 |
| 2011/0252805 A1* | 10/2011 | Berry | F23R 3/44 60/772 |
| 2012/0036858 A1* | 2/2012 | Lacy | F23R 3/002 60/754 |
| 2012/0198854 A1* | 8/2012 | Schilp | F23R 3/002 60/755 |
| 2013/0025285 A1* | 1/2013 | Stewart | F23R 3/286 60/740 |
| 2014/0170433 A1 | 6/2014 | Schick et al. | |
| 2014/0237784 A1* | 8/2014 | Lacy | B23P 17/00 29/17.3 |
| 2014/0283520 A1* | 9/2014 | McMahan | F23R 3/002 60/752 |
| 2015/0113998 A1* | 4/2015 | Tatsumi | F23R 3/002 60/776 |
| 2015/0167983 A1* | 6/2015 | McConnaughhay | F23R 3/286 60/726 |
| 2015/0285504 A1* | 10/2015 | Melton | B23K 26/702 60/737 |
| 2017/0051917 A1* | 2/2017 | Varney | F23R 3/60 |
| 2017/0138267 A1* | 5/2017 | Hughes | F23R 3/12 |
| 2018/0100436 A1* | 4/2018 | DiCintio | F23R 3/002 |
| 2020/0025083 A1* | 1/2020 | Moura | F23R 3/26 |
| 2020/0170433 A1 | 6/2020 | Narberhaus | |

\* cited by examiner

SYSTEMS AND METHODS FOR VARIABLE MICROCHANNEL COMBUSTOR LINER COOLING

BACKGROUND

The subject matter disclosed herein relates to gas turbines and, more particularly, to systems and methods for cooling a combustor liner.

Gas turbine systems typically include at least one gas turbine engine having a compressor, a combustor, and a turbine. The compressor provides a compressed air to the combustor, which uses the compressed air to combust a fuel in a combustion reaction. Accordingly, components of the combustor may experience thermal stress and degradation due to the combustion reaction. Therefore, it is desirable to protect the combustor from such thermal stress and degradation, thereby reducing downtime for maintenance.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a combustor liner disposed about a combustion chamber of a combustor of a gas turbine system. The combustor liner includes an inner wall portion exposed to the combustion chamber, an outer wall portion disposed about the inner wall portion, and multiple channels between the inner and outer wall portions of the combustor liner. Each channel of the multiple channels is configured to direct a coolant along the combustor liner to convectively cool the combustor liner, and each channel of the multiple channels includes a cross-sectional area that progressively changes along a length of each channel of the plurality of channels.

In accordance with a second embodiment, a system includes a combustor liner disposed about a combustion chamber of a combustor of a gas turbine system. The combustor liner includes an inner wall portion exposed to the combustion chamber, an outer wall portion disposed about the inner wall portion, and multiple channels between the inner and outer wall portions of the combustor liner. Each channel of the multiple channels is configured to direct a coolant along the combustor liner to convectively cool the combustor liner, and each channel of the multiple channels is a microchannel.

In accordance with a third embodiment, a system includes a combustor liner disposed about a combustion chamber of a combustor of a gas turbine system. The combustor liner includes an inner wall portion exposed to the combustion chamber, an outer wall portion disposed about the inner wall portion, and multiple channels between the inner and outer wall portions of the combustor liner. Each channel of the multiple channels is configured to direct a coolant along the combustor liner to convectively cool the combustor liner. The combustor liner further includes an inlet guide having a ramp and an opening upstream from inlets of the multiple channels. The ramp and the opening extend circumferentially about the combustor liner.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
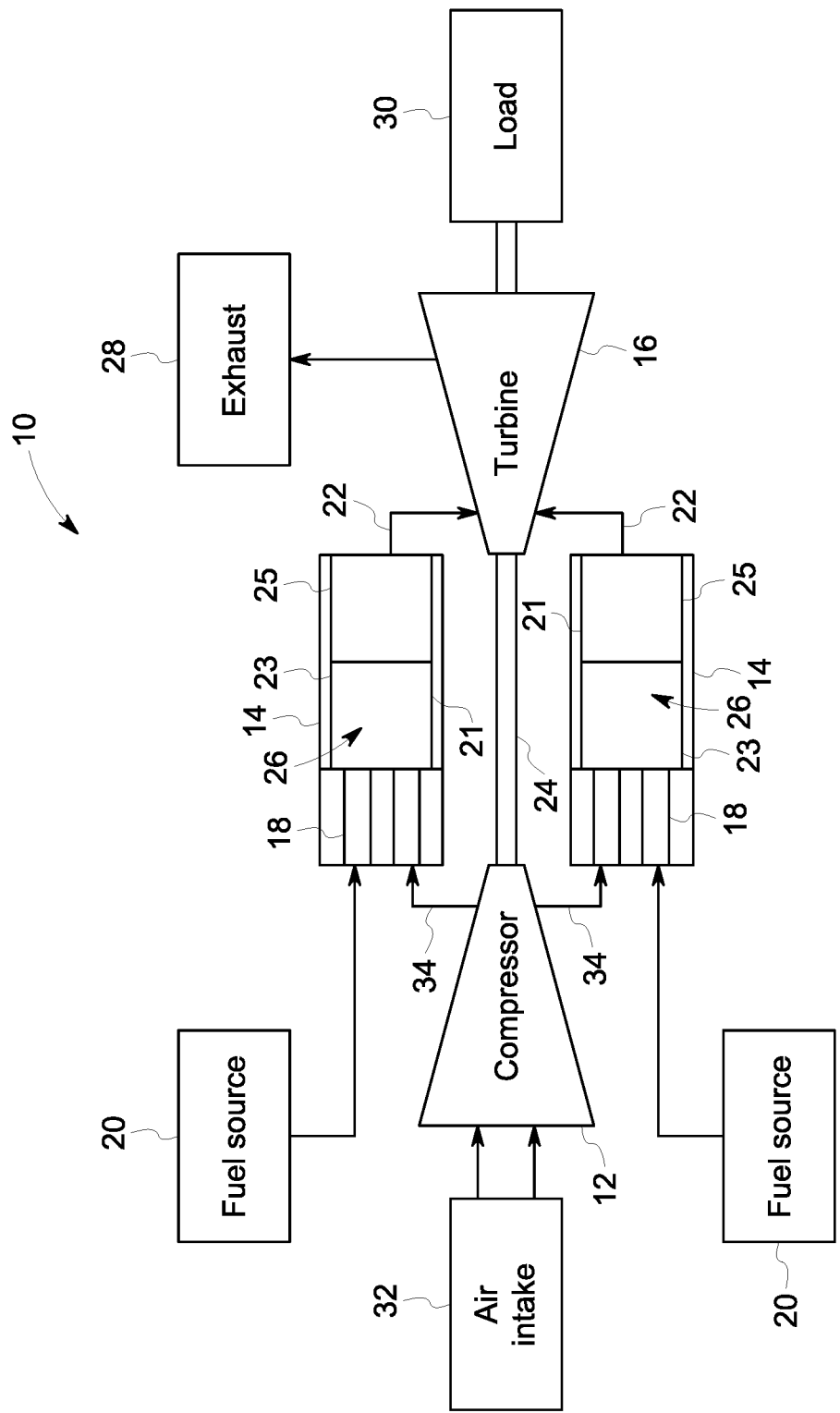
FIG. 1 is a block diagram of an embodiment of a gas turbine system having variable microchannel cooling in a wall (e.g., combustor liner) of a combustor.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed toward cooling an aft end portion (e.g., downstream end portion) of a wall (e.g., a combustor liner) of a combustor of a gas turbine system. During operation of the gas turbine system, various components of the combustor are exposed to significant heat and thermal stress due to combustion reactions occurring within a combustion chamber inside the combustor. The combustion chamber is surrounded by the combustor liner, which may be cooled to help reduce thermal stress caused by the combustion reactions. More specifically, without sufficient cooling, the combustor liner may experience significant thermal stress at the aft end portion (e.g., the downstream end portion of the combustor liner closer to the turbine as the hot combustion products flow from the combustion chamber into the turbine). The turbine system may use a variety of cooling techniques to reduce the thermal stress in the combustor liner; however, certain cooling techniques have drawbacks. For example, the turbine system may utilize impingement cooling with an airflow from the compressor directed in a radial direction toward the combustor liner relative to a longitudinal axis of the combustor liner. Unfortunately, the impingement cooling may cause focused spots of cooling at impingement locations, and may not adequately cool other areas (e.g., hot spots) of the aft end portion of the combustor liner. For example, in some instances, the aft end of the combustor liner may be disposed within a front end of a transition piece of the combustor. Further, an interface between the aft end of the combustor liner and the front end of the transition piece may be occluded by a seal. Accordingly, the positioning of the combustor liner within the transition piece and the placement of the seal may cause airflow from the compressor to flow across the front end of the transition piece and not flow across the aft end of the combustor liner, which may result in adequate cooling of the aft end of the combustor liner. In some instances, the impingement cooling discussed above may be utilized at a front of the aft end of the combustor liner in an attempt to cool the aft end of the combustor liner. However, the impingement cooling may be ineffective in cooling a majority of the aft end of the combustor liner due to the focused cooling impingement locations at the front of the aft end of the combustor liner.

Further, the turbine system may include a sleeve or liner configured to direct the airflow from the impingement cooling along the aft end portion of the combustor liner. The cooling performance of this sleeve may depend on contact between the sleeve and the combustor liner along a length of the sleeve (e.g., conductive heat transfer between the separate parts). Unfortunately, the sleeve may be coupled to the combustor liner only at discrete locations (e.g., an upstream end) of the sleeve. Over time, due to thermal stress, oxidation, etc., the sleeve may lose contact with the combustor liner (i.e., creating a gap and reduced conductive heat transfer), causing a decreased effectiveness of the cooling along the combustor liner.

Accordingly, as discussed in further detail below, the disclosed embodiments include systems and methods for cooling the aft end portion of the combustor liner using one or more rows or layers of variable microchannels between inner and outer wall portions of the combustor liner. In certain embodiments, each row or layer may include one or more variable microchannels extending in a generally downstream direction along the combustor liner (i.e., downstream relative to the flow of hot combustion gases inside the combustion chamber), and the one or more variable microchannels in each layer may be spaced circumferentially about the longitudinal axis of the combustor liner. In embodiments with multiple layers of the variable microchannels, the layers may be arranged one over another such as a first layer disposed circumferentially about the longitudinal axis at a first radial distance from the longitudinal axis, a second layer disposed circumferentially about the first layer at a second radial distance from the longitudinal axis, a third layer disposed circumferentially about the second layer at a third radial distance from the longitudinal axis, and so forth. However, in certain embodiments, the variable microchannels may be disposed in a single row or layer, e.g., a plurality of variable microchannels spaced circumferentially about the longitudinal axis. For purposes of the following discussion, reference may be made to a variable microchannel row or layer; however, it should be understood that the variable microchannel row or layer may refer to any number of rows or layers of variable microchannels (e.g., 1, 2, 3, 4, 5, 6, 7, 8, 9, 10, or more).

The variable microchannel layer is configured to direct a coolant (e.g., a cooling fluid) in an axial direction along the combustor liner relative to the longitudinal axis of the combustor liner. The cooling fluid may include a liquid or gas, such as an airflow extracted from the compressor. The combustor liner may further include an inlet guide (e.g., a ramp) disposed upstream of the variable microchannel layer, wherein the inlet guide is configured to direct the cooling fluid (e.g., airflow) in the axial direction toward and into an inlet of each microchannel in the variable microchannel layer. In this manner, the disclosed embodiments may effectively cool the aft end portion of the combustor liner without impingement cooling in the radial direction, thereby reducing the possibility of localized cooling spots and hot spots on the combustor liner. Indeed, as mentioned above, the position of the combustor liner within the transition piece and the position of the seal between the aft end of the combustor liner and the transition piece may prevent effective impingement cooling of the aft end of the transition piece. Accordingly, the inlet guide is positioned toward a front of the aft end of the transition piece to avoid impingement cooling, and to guide air axially along the aft end of the combustor liner for effective cooling along an entirety of the aft end of the combustor liner and further for prevention of thermal strains. In other words, the axial supply of the airflow provides for a more uniform distribution of the cooling airflow along the combustor liner, particularly as the cooling airflow enters each microchannel of the variable microchannel layer. The variable microchannel layer provides a plurality of microchannels spaced circumferentially about the longitudinal axis of the combustor liner, each microchannel directing the airflow along the aft end portion of the combustor liner (e.g., in an axial direction along the longitudinal axis of the combustor liner). Each microchannel in the variable microchannel layer has a variable cross-section that progressively changes (e.g., decreases) in a cross-sectional area along a length of the microchannel toward the aft end of the combustor liner, thereby accelerating the cooling airflow along the aft end portion of the combustor liner, and increasing an amount of convective heat transfer from the combustor liner into the airflow along the aft end portion of the combustor liner.

Further, the variable microchannel layer is directly coupled to (or integrally formed in) the combustor liner along all or most of a length of the variable microchannel layer, thereby helping to prevent loss of contact and conductive heat transfer between parts of the combustor liner. For example, the variable microchannel layer may be integrally formed in the combustor liner between the inner and outer wall portions of the combustor liner (e.g., a one-piece structure made via additive manufacturing, 3D printing, casting, machining, etc.). By further example, one or more microchannels of the variable microchannel layer may be disposed along a surface of the inner wall portion, the outer wall portion, or both the inner and wall portions, which are directly coupled together via brazing (e.g., using pre-sintered preforms [PSP's], welding, fasteners, or a combination thereof. For example, the inner wall portion and/or the outer wall portion of the combustor liner may be a PSP, which can be heated to cause bonding (e.g., brazing) at substantially all of the interface between the inner and outer wall portions except for the volume inside of the variable microchannels.

Turning now to the drawings, FIG. 1 illustrates a block diagram of an embodiment of a gas turbine system 10. The gas turbine system 10 includes a compressor 12, one or more turbine combustors 14, and a turbine 16. The turbine combustors 14 include fuel nozzles 18, which route a fuel into the turbine combustors 14 from a fuel source 20, such as a fuel skid. The fuel source 20 may supply a liquid fuel and/or a gaseous fuel, such as natural gas and/or syngas generated from a gasification system (e.g., a gasifier that produces syngas from a feedstock such as coal). The turbine combustors 14 ignite and combust the fuel with an oxidant, such as compressed air from the compressor 12. The fuel nozzles 18 may premix the fuel and oxidant (e.g., a fuel-air mixture) prior to delivery into a combustion chamber 26 and/or the fuel nozzles 18 may separately deliver the fuel and oxidant into the combustion chamber 26 for a diffusion combustion. The fuel combusts with the oxidant in the combustion chamber 26, thereby producing hot pressurized combustion gasses 22 (e.g., exhaust). An inner wall 21 of the combustor 14 extends circumferentially about the combustion chamber 26 and routes the combustion gasses 22 into the turbine 16. For example, the inner wall 21 may include a combustor liner 23 and a transition piece 25. The combustor liner 23 is a tubular structure disposed about the combustion chamber 26 of the combustor 14, and thus is directly exposed to the combustion reaction occurring in the combustion chamber 26. As a result, the combustor liner 23 is exposed to significant heat and can experience significant thermal stress from the combustion reaction occurring within the combustion chamber 26. Accordingly, as discussed in further detail below, the combustor liner 23 may include one or more rows or layers of variable microchannels between inner and outer wall portions of the combustor liner and an inlet guide (e.g., a ramp) to guide a coolant (e.g., air) into inlets of the variable microchannels. The transition piece 25 may be described as a duct that transfers the hot combustion gases 22 from the combustion chamber 26 to the turbine 16.

Turbine blades within the turbine 16 are coupled to a shaft 24 of the gas turbine system 10, which may also be coupled to several other components throughout the turbine system 10. As the combustion gases 22 flow against and between the turbine blades of the turbine 16, the turbine 16 is driven into rotation, which causes the shaft 24 to rotate. Eventually, the combustion gases 22 exit the turbine system 10 via an exhaust outlet 28. Further, in the illustrated embodiment, the shaft 24 is coupled to a load 30, which is powered via the rotation of the shaft 24. The load 30 may be any suitable device that generates power via the rotational output of the turbine system 10, such as an electrical generator, a propeller of an airplane, or other load.

The compressor 12 of the gas turbine system 10 includes compressor blades. The compressor blades within the compressor 12 are coupled to the shaft 24, and will rotate as the shaft 24 is driven to rotate by the turbine 16, as discussed above. As the compressor blades rotate within the compressor 12, the compressor 12 compresses air (or any suitable oxidant) received from an air intake 32 to produce pressurized air 34. The pressurized air 34 is then fed into the fuel nozzles 18 of the combustors 14. As mentioned above, the fuel nozzles 18 deliver the pressurized air 34 and fuel into the combustion chamber 26 for combustion to drive rotation of the turbine 16.

Figure 2:
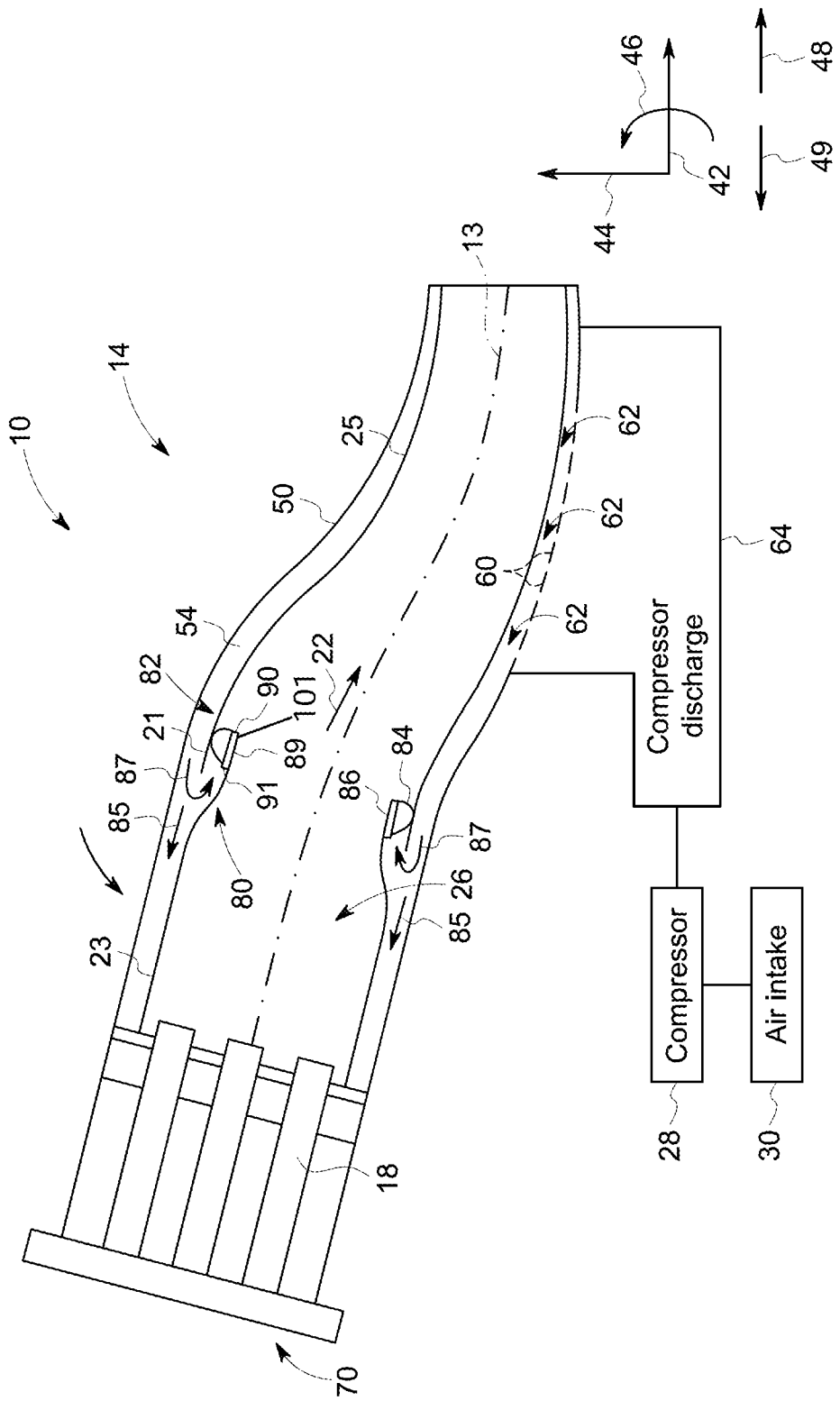
FIG. 2 is a cross-sectional schematic view of an embodiment of a combustor of the gas turbine system of FIG. 1, illustrating the combustor liner having variable microchannel cooling.

Keeping this in mind, FIG. 2 is a cross-sectional schematic view of one of the combustors 14 of the gas turbine system 10. In the following discussion, reference may be made to an axial direction or axis 42 (e.g., along a longitudinal axis 13) of the combustor 14, a radial direction or axis 44 extending radially away from the longitudinal axis 13 of the combustor 14, and a circumferential direction or axis 46 extending circumferentially about the longitudinal axis 13 of the combustor 14. In some embodiments, due to the non-symmetrical shape of the combustor 14, the longitudinal axis 13 (and the axial direction 42) of the combustor 14 may be non-linear through the combustor 14. Particularly, the longitudinal axis 13 (and the axial direction 42) may be disposed coaxial to a flow of the combustion gases 22 through the combustor 14. Reference may also be made to a downstream direction 48 and an upstream direction 49 relative the flow direction of the combustion gases 22 through the combustor 14.

As shown, each combustor 12 includes an outer wall (e.g., flow sleeve 50) disposed circumferentially 46 about the inner wall 21 to define an intermediate flow passage or space 54 disposed between the flow sleeve 50 and the inner wall 21. The inner wall 21 includes the combustor liner 23 and the transition piece 25. The combustor liner 23 extends circumferentially 46 about the combustion chamber 26. The transition piece 25 generally converges toward a first stage of the turbine 16 to direct combustion gases 22 toward the turbine 16, as discussed above. The flow sleeve 50 may include a plurality of perforations 60 (e.g., air inlets), which direct an airflow 62 (e.g., the pressurized air 34) from a compressor discharge 64 into the flow passage 54. The airflow 62 flows along the outer surface of the inner wall 21 (e.g., the combustor liner 23 and/or the transition piece 25) to convectively cool the inner wall 21. Particularly, the flow passage 54 directs the airflow 62 in the upstream direction 49 (e.g., opposite to the downstream direction 48) toward a head end 70 (e.g., the upstream end of the combustor 14 relative to the downstream direction 48), such that the airflow 62 further cools the inner wall 21 before flowing through the fuel nozzles 18, and into the combustion chamber 26.

As illustrated in FIG. 2, an aft end portion 80 of the combustor liner 23 may be disposed radially 44 and circumferentially 46 within an upstream end 82 of the transition piece 25. As discussed in detail below with reference to FIG.

3, the aft end portion 80 of the combustor liner 23 includes fluid flow passages or channels 90 (e.g., variable microchannels) disposed between an inner wall portion 89 (e.g., on the hot side facing the combustion chamber 26) and an outer wall portion 91 (e.g., on the cold side further away from the combustion chamber 26) of the combustor liner 23. The inner wall portion 89 is disposed circumferentially about the combustion chamber 26, the outer wall portion 91 is disposed circumferentially about the inner wall portion 89, and the channels 90 are spaced circumferentially about the longitudinal axis 13 radially between the inner and outer wall portions 89 and 91 and extend in the axial direction 42. In certain embodiments, the inner and outer wall portions 89 and 91 are integral portions (e.g., layers 89 and 91) of a one-piece structure 101 defining the combustor liner 23. For example, the aft end portion 80 and/or the entire combustor liner 23 may be a single continuous piece of material (e.g., the one-piece structure 101) with the channels 90 (e.g., variable microchannels) integrally formed inside (i.e., between the inner and outer wall portions 89 and 91). However, in some embodiments, the outer wall portion 91 may include a covering or tubular sleeve 86 attached to the aft end portion 80 of the combustion liner 23 (i.e., the inner wall portion 89). For example, the covering 86 may be directly coupled to and disposed circumferentially 46 about the aft end portion 80 of the combustor liner 23 along substantially all or an entirety of an interface between the covering 86 and the combustor liner 23. Particularly, as shown, the covering 86 is coupled to a cold side (e.g., external surface) of the combustor liner 23, as opposed to a hot side (e.g., internal surface) of the combustor liner 23, which may be exposed to the hot combustion gasses 22 in the combustion chamber 26. The combustor 14 may further include a seal 84 (e.g., a hula seal) disposed radially 44 and circumferentially 46 between the aft end portion 80 of the combustor liner 23 and the upstream end 82 of the transition piece 25. More specifically, the seal 84 is disposed directly radially 44 and circumferentially 46 between the outer wall portion 91 (e.g., the covering 86) and the transition piece 25, as shown.

The channels 90 (e.g., variable microchannels) are configured to route a portion of the airflow 62 along an outer surface of the aft end portion 80 of the combustor liner 23 in the downstream direction 48 for cooling purposes. For example, as shown, a first portion 85 of the airflow 62 may flow upstream 49 within the flow passage 54 towards the head end 70 of the combustor, and a second portion 87 of the airflow 62 may flow within the flow passage 54 and also be redirected to flow in the downstream direction 48 between the combustor liner 23 and the transition piece 25. More specifically, the second portion 87 of the airflow 62 is directed to flow in a radial inward direction 44 and turn in the axial direction 42 from the upstream direction 49 to the downstream direction 48 into inlets into the channels 90 (e.g., variable microchannels) to convectively cool the aft end portion 80 of the combustor liner 23, as discussed in further detail below.

Figure 3:
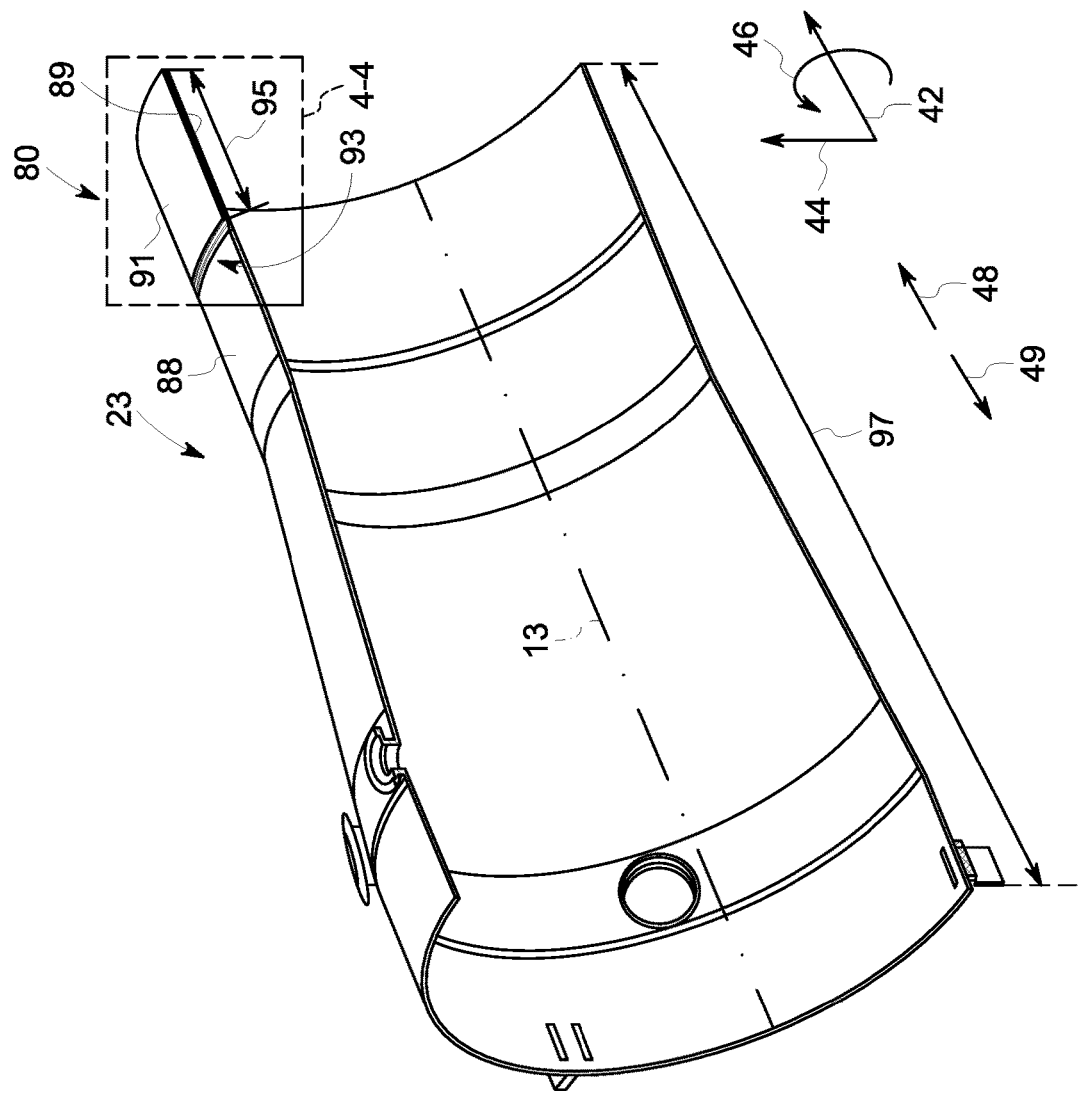
FIG. 3 is a cutaway perspective view of an embodiment of the combustor liner of the combustor of FIG. 2, illustrating the variable microchannel cooling in an aft end portion of the combustor liner.
Figure 4:
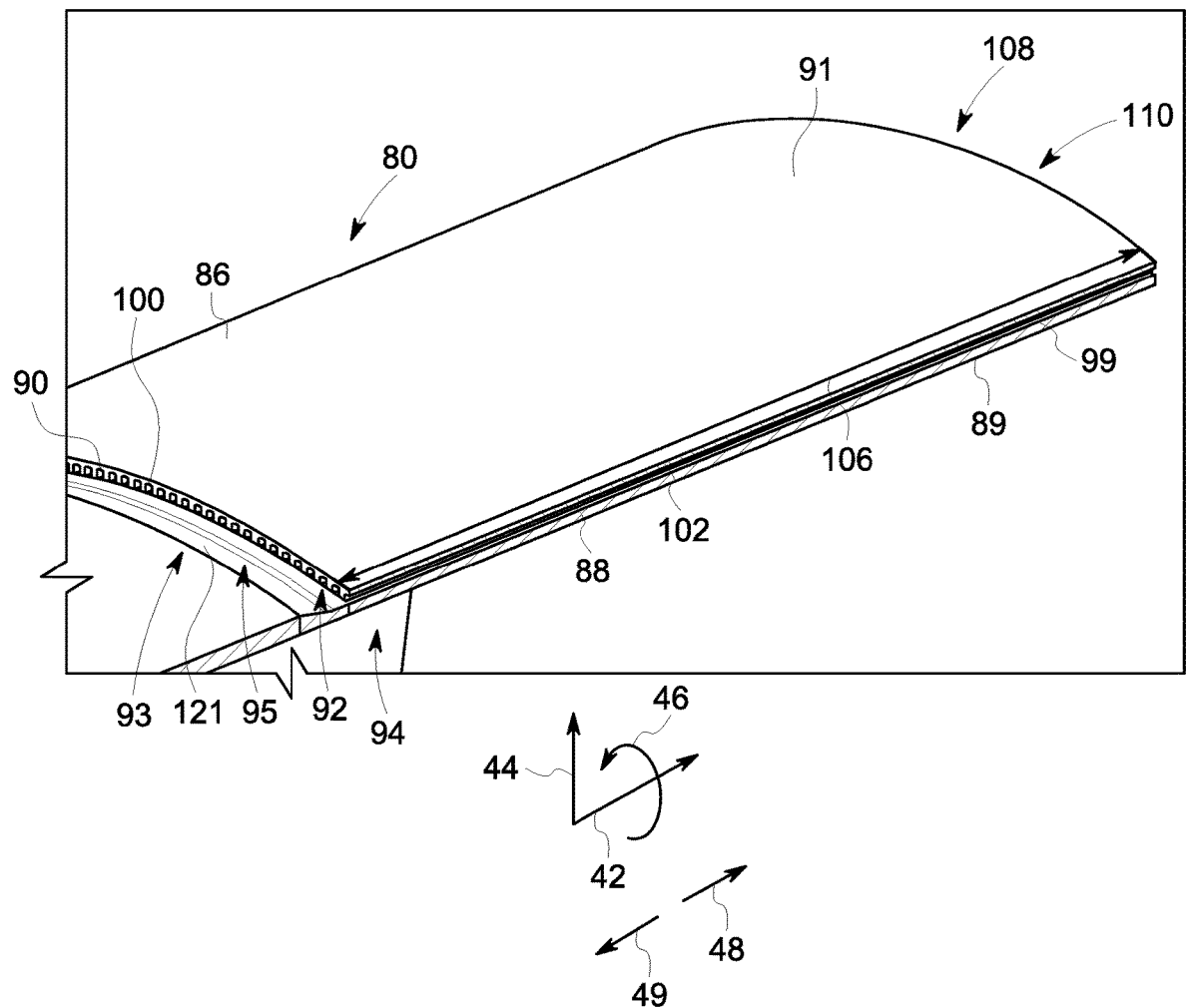
FIG. 4 is a partial cutaway perspective view of an embodiment of the combustor liner of FIG. 3, taken within line 4-4, illustrating the aft end portion having an inlet guide upstream from variable microchannels between inner and outer wall portions.

FIG. 3 is a cut-away perspective view of the combustor liner 23, illustrating a general position and scale of the aft end portion 80 having an inlet guide 93 and channels 90 between the inner and outer wall portions 89 and 91. FIG. 4 is a partial cut-away perspective view of the combustor liner 23 of FIG. 3, taken within dashed line 4-4, illustrating details of the aft end portion 80.

As illustrated in FIGS. 3 and 4, the aft end portion 80 of the combustor liner 90 has an inlet guide 93 adjacent inlets 92 into the channels 90. The inlet guide 93 extends circumferentially about the aft end portion 80 of the combustor liner 23. For example, the inlet guide 93 may include an opening 95 and a ramp 121 extending circumferentially (e.g., continuously or in two or more sections) about the aft end portion 80 of the combustor liner 23. The opening 95 and ramp 121 may be sized to provide a substantially uniform distribution of the airflow 62 along the aft end portion 80 adjacent and into the inlets 82 into the channels 90. In other words, the opening 95 and ramp 121 are configured to sufficiently distribute the airflow 62 to avoid hot spots and cold spots along the aft end portion 80, as opposed to colds spots attributed to impingement cooling through small impingement cooling holes in a sleeve over the opening 85. Therefore, by excluding impingement cooling holes in the illustrated embodiment, the inlet guide 93 substantially improves the cooling and reduces thermal stress in the aft end portion 80. Indeed, as discussed above, a supply of air in the radial direction 44 toward the combustor liner 84 from the flow passage 54 may provide localized cooling in the impingement locations of the air on the combustor liner 84, and ineffectively cool other portions of the aft end portion 80 of the combustor liner 23. Due to the generally open supply of the airflow 62 through the inlet guide 93 (e.g., opening 95 and ramp 121), the airflow 62 effectively cools a greater amount (e.g., or an entirety) of the aft end portion 80 of the combustor liner 23 in a more uniform manner.

As illustrated in FIG. 3, an axial length 96 of the aft end portion 80 is less than half of a total axial length 97 of the combustor liner 23. For example, the axial length 96 may be less than or equal to approximately 5, 10, 15, 20, 25, 30, 35, 40, 45, or 50 percent of the total axial length 97. However, the inlet guide 93 and channels 90 may be disposed along any portion of the combustor liner 23.

As illustrated in FIG. 4, the aft end portion 80 has a plurality of the channels 90 (e.g., variable microchannels) spaced apart from one another circumferentially 46 about the longitudinal axis 13 radially between the inner and outer wall portions 89 and 91. Each channel 90 extends in the axial direction 42, such that the plurality of channels 90 are parallel to one another and generally form a row of circumferentially spaced axial channels 90. In the illustrated embodiment, the plurality of channels 90 are arranged in a common radial position or height, and thus may be considered a single row of the circumferentially spaced axial channels 90. However, in some embodiments, the aft end portion 80 may include a plurality of rows of circumferentially spaced axial channels 90, each row being at a different radial position or height in the radial direction 44. As noted above, the channels 90 are disposed radially between the inner and outer wall portions 89 and 91, which may form a one-piece structure (i.e., integral portion of the combustor liner 23) or separate pieces that are coupled together along an intermediate interface 99. For example, in certain embodiments, the outer wall portion 91 may include a covering or tubular sleeve 86, which couples to the inner wall portion 89 of the combustor liner 23 at all or substantially all of the interface 99. In either embodiment, the channels 90 may be disposed in the inner wall portion 89, in the outer wall portion 91 (e.g., the covering 86), or a combination thereof.

For example, the covering 86 may be directly coupled to an exterior, outer or external surface 88 of the combustor liner 23 (i.e., the interface 99 between the inner and outer wall portions 89 and 91), wherein the external surface 88 is on a cold side of the combustor liner 23 facing away from the combustion chamber 26 (i.e., opposite from a hot side of the combustor liner 23 directly exposed to the combustion reaction). In the illustrated embodiment, the covering 86 includes the channels 90 (e.g., variable microchannels) having inlets 92 disposed at an upstream end 94 of the covering 86 facing axially 42 in the upstream direction 49. In this manner, impingement of the airflow 62 on the combustor liner 23 is avoided as the airflow 62 enters the covering 86 in the axial direction 42. More specifically, the inlet guide 93 uses the opening 95 and ramp 121 to route the airflow 62 in a radial inward direction 44 and reverse the flow direction from the upstream direction 49 to the downstream direction 48 prior to entering the inlets 92 of the channels 90.

As discussed herein, the channels 90 may be microchannels configured to increase a flow of the airflow 62 along the aft end portion 80 of the combustor liner 23 (relative to larger-sized channels), thereby enhancing cooling effects of the airflow 62. In some embodiments, the channels 90 may be defined by recessed surfaces or elongated grooves 100 disposed along the interface 99, such as along an internal surface 102 of the covering 86 and/or the external surface 88 of the combustor liner 23. In this way, the airflow 62 may be in direct contact with the external surface 88 of the combustor liner 23 as the airflow 62 travels within the channels 90. Accordingly, the airflow 62 may convectively transfer heat away from the combustor liner 23, thereby providing cooling to the combustor liner 23.

The channels 90 extend along a length 106 of the outer wall portion 91 (e.g., covering 86) and include outlets 108 disposed at a downstream end 110 of the outer wall portion 91 facing axially 42 in the downstream direction 48. As discussed in further detail below, a cross-sectional area of each channel 90 varies (e.g., decreases) along the length 106 of the outer wall portion 91 (e.g., covering 86) in the downstream direction 48 from the inlet 92 toward the outlet 98. In this manner, the airflow 62 accelerates through the channels 90 as the airflow 62 travels from the inlets 92 toward the outlets 108 along the length 106 of the outer wall portion 91. Particularly, the acceleration of the airflow 62 along the length 106 of the outer wall portion 91 causes the airflow 62 to more effectively cool the aft end portion 80 along an entirety of the length 106 of the outer wall portion 91. Indeed, the acceleration of a speed of the airflow 86 along the length 106 promotes an enhancement of a heat transfer coefficient between the airflow 86 and the combustor liner 23 towards the downstream end 110 of the combustor liner 23.

Figure 5:
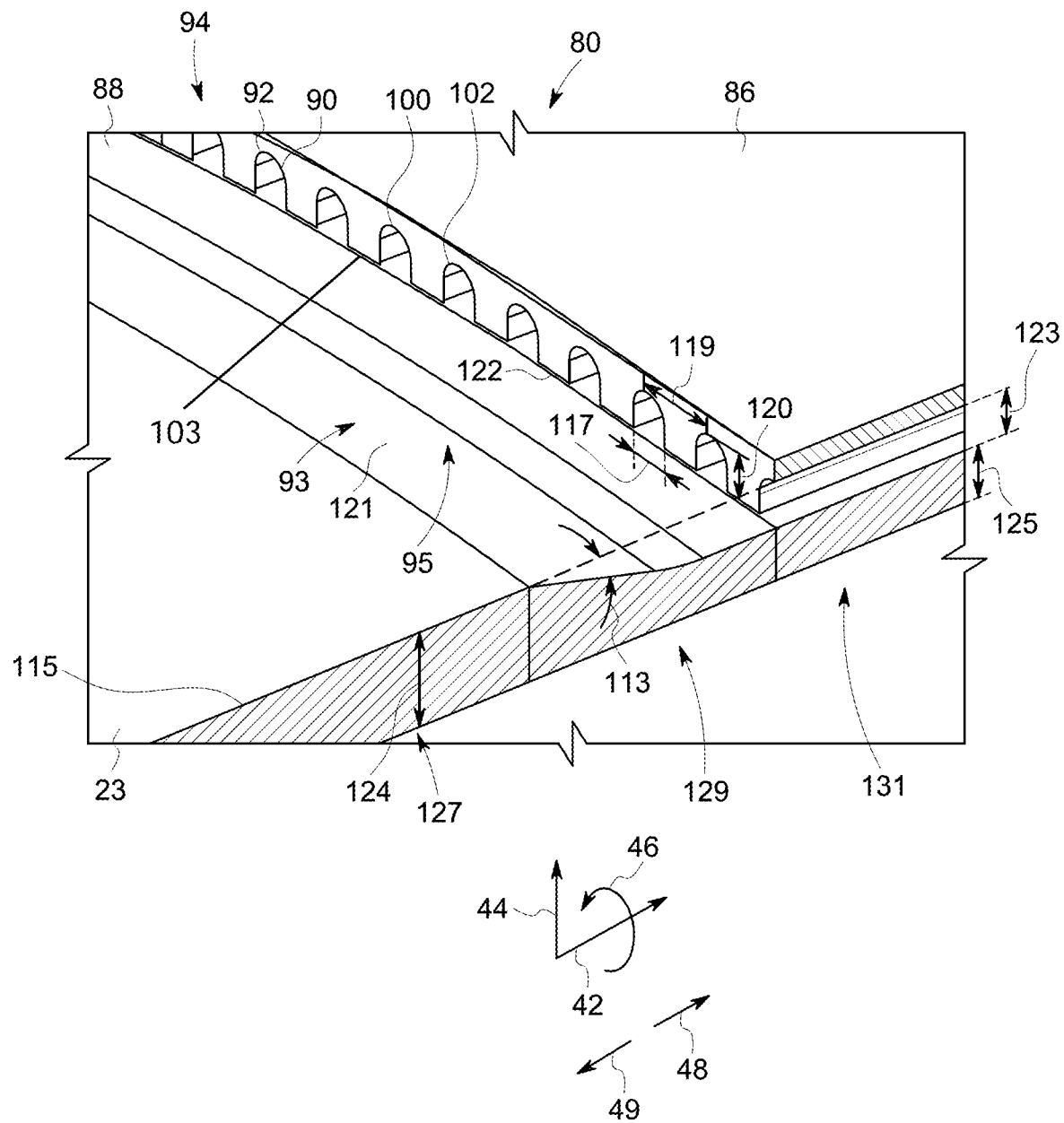
FIG. 5 is a partial cutaway perspective view of an embodiment of the aft end portion of the combustor liner of FIG. 4, illustrating an upstream end of the aft end portion having an inlet guide upstream from inlets into the variable microchannels.
Figure 6:
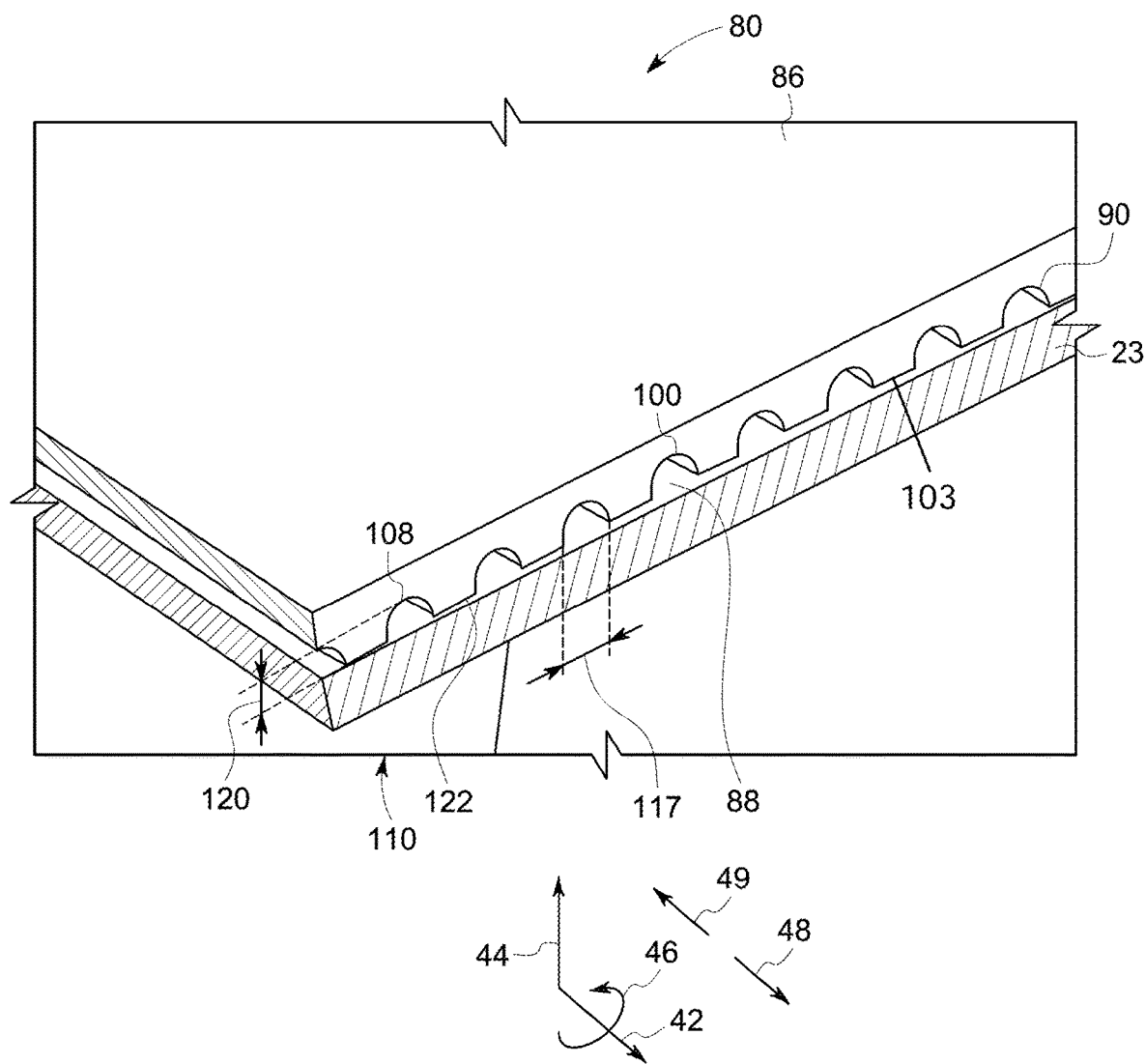
FIG. 6 is a partial cutaway perspective view of an embodiment of the aft end portion of the combustor liner of FIG. 4, illustrating a downstream end of the aft end portion having outlets of the variable microchannels.

To illustrate, FIGS. 5 and 6, which may now be discussed in parallel, show cutaway perspective views of the aft end portion 80 of the combustor liner 23. More specifically, FIG. 5 shows the upstream end 94 of the aft end portion 80, illustrating details of the outer wall portion 91 (e.g., covering 86) and channels 90 adjacent the inlet guide 93. FIG. 6 shows the downstream end 110 of the aft end portion 80, illustrating details of the channels 90 exiting between the inner and outer wall portions 89 and 91.

As shown in FIGS. 5 and 6, each channel 90 (e.g., variable microchannel) may have a variable (e.g., decreasing) cross-section from the inlet 92 at the upstream end 94 to the outlet 108 at the downstream end 110. For example, the inlets 92 of the channels 90 at the upstream end 94 of the outer wall portion 91 (e.g., covering 86) may have a larger cross-section relative to the outlets 108 of the channels 90 at the downstream end 110 of the outer wall portion 91. The cross-sectional area of the channels 90 may vary (e.g., decrease) in a linear or non-linear manner from the inlet 92 to the outlet 108 of each channel 90. In certain embodiments, the cross-sectional area of each outlet 108 may be approximately 50-75 percent, 55-70 percent, or 60 to 65 percent of the cross-sectional area of each inlet 92, and the cross-sectional area of each channel 90 may vary (e.g., decrease) linearly or non-linearly from the inlet 92 to the outlet 108. In some embodiments, the cross-sectional area of each outlet 108 may be less than or equal to approximately 50, 55, 60, 65, 70, 75, 80, 85, 90, or 95 percent of the cross-sectional area of each inlet 92. In certain embodiments with the channels 90 being microchannels, each microchannel 90 may have a cross-sectional area of less than or equal to approximately 0.01, 0.009, 0.008, 0.007, 0.006, 0.005, 0.004, 0.003, or 0.002 square inches (or less than or equal to approximately 6.45, 5.8, 5.16, 4.51, 3.87, 3.22, 2.58, 1.94, or 1.29 square millimeters) at the inlet 92, the outlet 108, and therebetween. For example, in embodiments with the channels 90 being microchannels, each microchannel 90 may have a depth 120 (i.e., in the radial direction 44) and a width 117 (i.e., in the circumferential direction 46), wherein the depth 120 and width 117 are each less than or equal to approximately 0.1, 0.09, 0.08, 0.07, 0.06, 0.05, 0.04, or 0.03 inches (or less than or equal to approximately 2.54, 2.29, 2.03, 1.78, 1.52, 1.27, 1.02, or 0.76 millimeters) at the inlet 92, the outlet 108, and therebetween. The depth 120 and/or width 117 may vary (e.g., decrease) linearly or non-linearly from the inlet 92 to the outlet 108 of each channel 90. Furthermore, in certain embodiments, the depth 120 and width 117 of each microchannel 90 may be substantially equal to one another or within approximately 10, 20, 30, 40, 50, or 60 percent of one another at any particular position along the channel 90, such as at the inlet 92, the outlet 108, and/or a position therebetween. For example, the depth 120 may be at least 60, 70, 80, 80, or 100 percent of the width 117 of each microchannel 90 at any position along the channel 90, such as at the inlet 92, the outlet 108, and/or a position therebetween. In certain embodiments, the ratio of the depth 120 relative to the width 117 may be equal or vary from the inlet 92 to the outlet 108. For example, the width 117 may be equal from the inlet 92 to the outlet 108, while the depth 120 may vary (e.g., decrease) from the inlet 92 to the outlet 108. By further example, the depth 120 may be equal from the inlet 92 to the outlet 108, while the width 117 may vary (e.g., decrease) from the inlet 92 to the outlet 108.

In operation, the channels 90 (e.g., variable microchannels) improve heat transfer by more closely spacing the channels 90 and increasing a flow speed of the airflow 62 through the channels 90 relative to larger-sized channels. Indeed, as channels 90 may be microchannels 90, a peak-to-peak distance 119 between each of the channels 90 may be relatively small, such as less than or equal to approximately 0.1, 0.15, or 0.2 inches (or less than or equal to approximately 2.54, 3.81, or 5.08 millimeters).

Further, as discussed above, the airflow 62 may enter the inlet 92 in the axial direction 42. To this end, the aft end portion 80 of the combustor liner 23 may include the inlet guide 93 with the opening 95 and the ramp 121 (e.g., an angled surface) disposed upstream 49 of the inlets 92 of the channels 90. For example, the ramp 121 may be defined by an outer diameter of the combustor liner 23 decreasing in the radial direction 42 (e.g., toward the flow of combustion gases 22 within the combustor 14). In other words, the ramp 121 may include an angled surface that is angled radially 44 toward an interior of the combustor liner 23. For example, an angle 113 of the ramp 121 may be less than or equal to approximately 5, 10, 15, 20, 25, 30, 35, 40, or 45 degrees relative to an interior or inner surface 115 of the combustor liner 23. Furthermore, the ramp 121 may be a transition between a first thickness 124 and a second thickness 125 of the combustor liner 23. As shown, the first thickness 124 is greater in distance than the second thickness 125. In some embodiments, an elevation change 123 of the ramp 121 (e.g., a difference between the first thickness 124 and the second thickness 125) may be approximately equal to the depth 120 of the inlet 92 to provide for a smooth transition of the airflow 62 into the inlet 92. The ramp 121 may be substantially smooth, such that a first portion 127 of the combustor liner 23 having the first thickness 124, a second portion 129 of the combustor liner 23 having the ramp 121, and a third portion 131 of the combustor liner 23 having the second thickness 125 may collectively be curvilinear and not include any sharp edges or abrupt changes in geometry. In some embodiments, the first portion 127, the second portion 129, and/or the third portion 129 may not include any surfaces oriented substantially parallel to the radial direction 44. In some embodiments, transitions between the first portion 127, the second portion 129, and/or the third portion 131 may include one or more corners having an interior angle greater than 90 degrees.

Generally, the opening 95 and the ramp 121 of the inlet guide 93 help to more uniformly distribute the airflow 62 along the surface of the aft end portion 80 adjacent and into the inlets 92 of the channels 90 (e.g., variable microchannels). In other words, unlike impingement cooling holes if used in this area, inlet guide 93 does not create cold spots and hot spots on the surface of the aft end portion 80 adjacent the inlets 92, and the inlet guide 93 helps to avoid a substantial pressure drop upstream of the inlets 92. Furthermore, the inlet guide 93 helps to direct the airflow 63 toward the inlets 92 in the axial direction 42. In this manner, the inlet guide 93 helps to improve heat transfer from the combustor liner 23 to the airflow 62 along an increased area of the aft end portion 80.

As discussed above in reference to FIGS. 3 and 4, in certain embodiments, the channels 90 may be disposed along the interface 99 between the external surface 88 of the combustor liner 88 and the internal surface 102 of the covering 86. For example, the channels 90 may include grooves 100 recessed into the external surface 88 of the combustor liner 88 and/or recessed into the internal surface 102 of the covering 86. In the illustrated embodiments of FIGS. 5 and 6, the channels 90 are defined by a space disposed between the grooves 100 recessed into the internal surface 102 of the covering 86 and the external surface 88 of the combustor liner 23. Moreover, the covering 86 may be directly coupled via a mechanical and thermally conductive bond 103 (e.g., a brazed connection) to the external surface 88 at a plurality of protrusions 122 of the covering 86. Particularly, the direct coupling between the protrusions 122 and the covering provides an air-tight seal between edges of the channels 90, thereby blocking the airflow 62 from traveling to locations disposed radially 44 between the protrusions 122 and the external surface 88 of the combustor liner 23. Indeed, as discussed below, the covering 86 may be mechanically and conductively bonded (e.g., brazed with a thermally conductive braze material—bond 103) to the combustor liner 23 along an entire length and width (e.g., an entire surface area) of each of the plurality of protrusions 122 extending between the upstream end 94 and the downstream end 110 of the covering 86. In this manner, the aft end portion 80 of the combustor liner 23 conductively transfers heat from the combustor liner 23, across the interface 99 into the protrusions 122, and into the remainder of the covering 86 along an entire length of the covering 86. However, in some embodiments, the covering 86 may be mechanically and conductively bonded (e.g., brazed with a thermally conductive braze material—bond 103) to the combustor liner 23 along at least 50, 60, 70, 80, 90, 95, or 100 percent of the length of the outer wall portion 91 (e.g., covering 86) and/or the surface area of the protrusions 122 contacting the inner wall portion 89.

Figure 7:
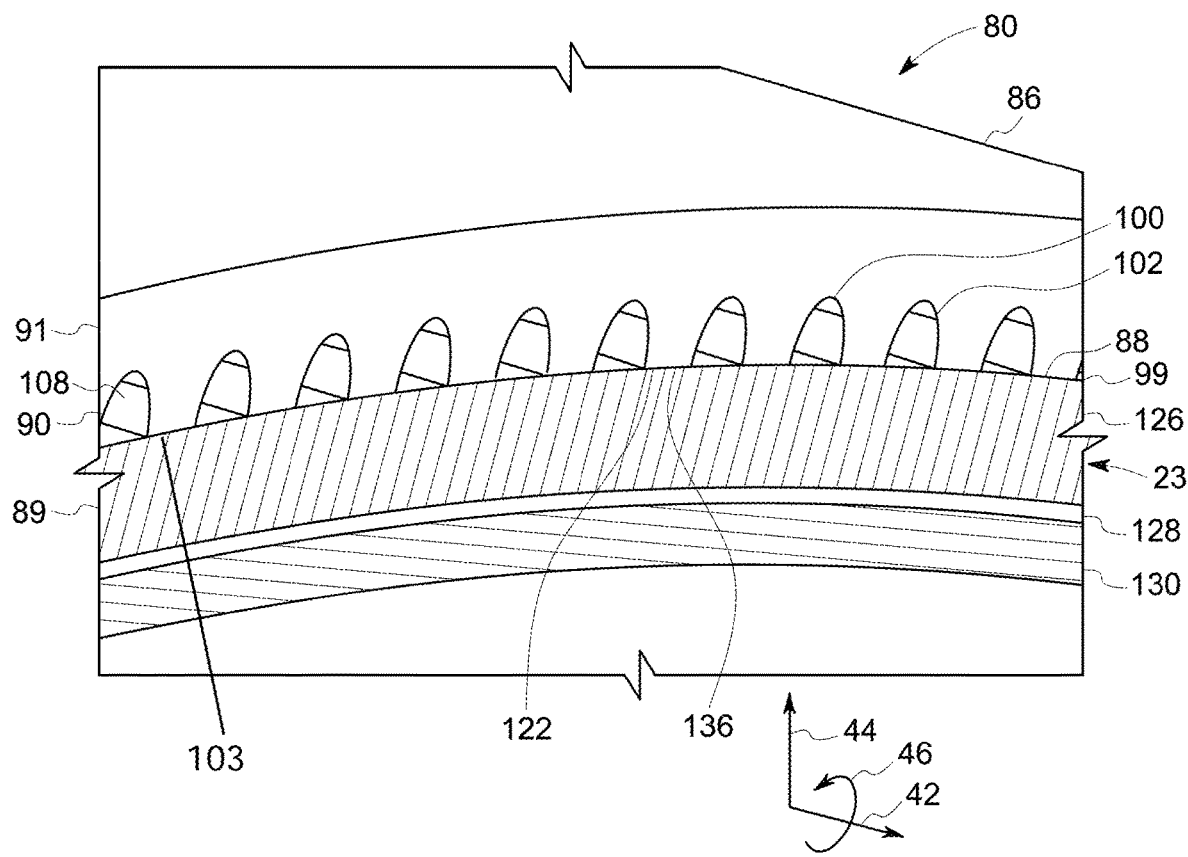
FIG. 7 is a partial perspective view of an embodiment of the downstream end of the aft end portion of FIG. 6, illustrating layers of the combustor liner.

FIG. 7 is a partial perspective view of the aft end portion 80 of the combustor liner 23, illustrating the outlets 108 of the channels 90 (e.g., variable microchannels) at the interface 99 of the inner wall portion 89 and the outer wall portion 91 (e.g., the covering 86). As shown, the inner wall portion 89 of the combustor liner 23 includes a liner base material or base layer 126, a bond coat or layer 128, and a thermal barrier coating (TBC) or layer 130, wherein the layers 126, 128, and 130 extend circumferentially about the longitudinal axis 13 and the combustion chamber 26. The TBC 130 may include metal and/or ceramic materials and is configured to thermally insulate components (e.g., the liner base material 126) of the combustor 14 from hot gases, such as those produced in the combustion chamber 26 within the combustor liner 23. The TBC 130 may be coupled to the liner base material 126 via the bond coat 128, as shown. The bond coat 128 provides adhesion between the liner base material 126 and the TBC 130. The bond coat 128 may also be corrosion resistant and provide additional insulation between the liner base material 126 and the gases produced in the combustion chamber 126. In some embodiments, the bond coat 128 may be formed of MCrAlY (e.g., where M=Nickel and/or Cobalt, Cr=Chromium, Al=Aluminum, and Y=Yttrium). The liner base material 126 may also be formed of a thermal resistant metallic alloy and/or ceramic.

In certain embodiments, the inner and outer wall portions 89 and 91 are directly coupled together along the interface 99, wherein the channels 90 (and thus the grooves 100) may be formed in the inner wall portion 89, the outer wall portion 91 (e.g., the covering 86), or a combination thereof. For example, the inner and outer wall portions 89 and 91 may be directly coupled together along an entirety of a surface area of the protrusions 122 contacting and bonded to the external surface 88 (e.g., bond 103). In the illustrated embodiment, the covering 86 is directly coupled to the external surface 88 of the combustor liner 23 (e.g., the external surface 88 of the liner base material 126). The covering 86 may be formed of a pre-sintered preform (PSP) material, which may exhibit a low degree of shrinkage. Indeed, the covering 86 may be a sintered metallurgy product that includes brazing materials (e.g., materials suitable for brazing) and superalloy materials (e.g., a blend of metals capable of withstanding high temperatures, stress, and highly oxidizing atmospheres). The internal surface 102 of the covering 86 may be defined by the grooves 100 and the protrusions 122, wherein the grooves 100 and protrusions 122 each extend in the axial direction 42 and are circumferentially spaced apart from one another (e.g., parallel grooves 100 interspaced with parallel protrusions 122). The covering 86 may be directly coupled to the external surface 88 of the liner base material 126 via the protrusions 122. At the interface 99, the internal surface 102 of the outer wall portion 91 (e.g., along the protrusions 122 of the covering 86) and the external surface 88 of the inner wall portion 89 may be contoured to substantially match one another to eliminate any potential gaps therebetween. In some embodiments, an outer surface 136 of the protrusions 122 may be substantially flat, or may be slightly curved, such as to accommodate the curved external surface 88 of the liner base material 126. In some embodiments, as discussed in further detail below, the internal surface 102 of the covering 86 may be substantially flat or smooth, and the external surface 88 of the combustor liner 23 may include the grooves 100.

The outer wall portion 91 (e.g., covering 86) may be coupled to the inner wall portion 89 (e.g., along the external surface 88 of the combustor liner 23) via a brazing process (e.g., a diffusion brazing process or vacuum brazing process). Indeed, as discussed above, the covering 86 may include brazing materials, which liquify in response to sufficient heat applied to the covering 86, fill the space along the interface 99 except for the channels 90, and then subsequently solidify to fixedly couple the covering 86 to the external surface 88 of the combustor liner 23. Accordingly, the brazing materials create a brazed bond (e.g., a mechanical and thermally conductive bond 103) between the covering 86 and the external surface 88 of the combustor liner 23. In certain embodiments, the braze material may be supplied independent from the covering 86, such as with a separate layer or insert that fits along the interface 99 and/or along the external surface 88 of the combustor liner 23. As discussed above, the covering 86 may be brazed to the combustor liner 23 along an entirety, or most, of the length 106 of the covering 86.

Figure 8:
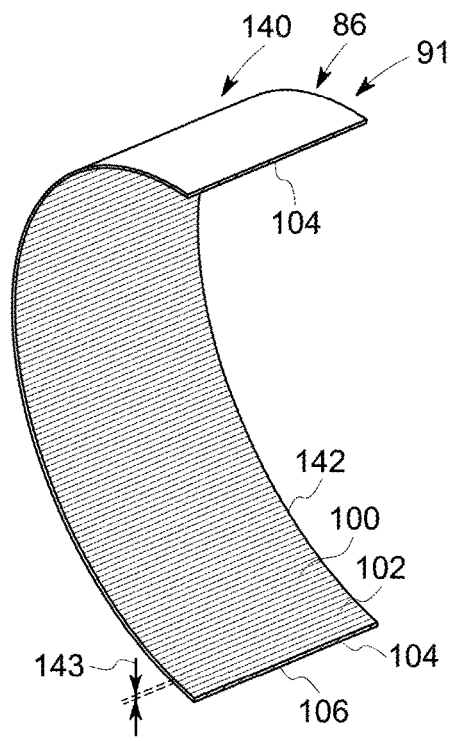
FIG. 8 is a cutaway perspective view of an embodiment of a sheet of a covering (e.g., forming the outer wall portion) of the combustor liner of FIG. 2.

FIG. 8 is a cutaway perspective view of a sheet 140 of the covering 86, which may be wrapped around and coupled to the aft end portion 80 of the combustor liner 23. The sheet 140 has the length 106, a width 142, and a thickness 143. The length 106 may be approximately 2 to 24, 3 to 20, or 4 to 12 inches (e.g., 5.1 to 61, 7.6 to 50.8, 10.2 to 30.5 centimeters), or any other suitable distance that is substantially equal to an axial 42 distance of the aft end portion 80 of the combustor liner 23. In this manner, the covering 86 may substantially cover an entirety of the aft end portion 80 of the combustor liner 23. However, it should be understood that in some embodiments, the length 106 may be greater or lesser than the axial 42 distance of the aft end portion 80 of the combustor liner 23.

The width 142 may be less than, greater than, or equal to a circumference of the aft end portion 80. For example, the covering 86 may be segmented into any number (e.g., 2, 3, 4, 5, 6, 7, 8, 9, 10, or more) of sheets 140 that are circumferentially spaced and joined together around an entirety of the circumference of the aft end portion 80. In one embodiment, the covering 86 is formed by two sheets 140, each extending circumferentially about approximately ½ of the circumference of the aft end portion 80. However, in some embodiments, a single sheet 140 may be used to form the covering 86. For example, the width 142 of the sheet 140 may be manufactured to substantially match the perimeter (e.g., circumference) of the combustor liner 23. In such an embodiment, the sheet 140 is wrapped around and pulled together, such that opposite ends 104 abut one another and are coupled together.

The thickness 143 of the sheet 140 may be approximately 0.05 to 0.2, 0.075 to 0.15, or 0.08 to 0.1 inches (or approximately 1.27 to 5.08, 1.91 to 3.81, or 2.03 to 2.54 millimeters). However, it is to be understood that the sheet 140 may include any suitable thickness 143 such that the sheet is flexible and is sufficiently thick as to accommodate the dimensions of the grooves 100, as discussed herein. In certain embodiments, the maximum depth 120 of each groove 100 (or microchannel 90) is at least approximately 50, 60, 70, 80, or 90 percent of the thickness 143 of the sheet 140. The thickness 143 may be uniform or variable (e.g., decreasing) in the downstream direction 48, and the thickness 143 may be uniform in the circumferential direction 46. As shown, the sheets 140 may include the grooves 100 (e.g., variable microchannels 90) disposed substantially parallel to the length 106. However, it is to be understood that in some embodiments, the grooves 100 (e.g., variable microchannels 90) may be angled (e.g., spiraled), relative to the length 106. Further, as discussed below, in some embodiments, the sheet 140 may be substantially smooth on the internal surface 102 and may not include the grooves 100, while the grooves 100 are disposed instead on the exterior surface 88 of the combustor liner 23.

In some embodiments, each sheet 140 of covering 23 may be a flexible material configured to be wrapped about the perimeter of the aft end portion 80 of the combustor liner 23. Indeed, in some embodiments, each sheet 140 may be manufactured as substantially flat, such that the length 106 dimension and the width 142 dimension may both be disposed within the same plane. Each sheet 140 may be flexed or deformed to conform to the curvature of the combustor liner 23. In this manner, the sheets 140 may be applied to many differently sized/shaped combustor liners 23 to form the covering 86.

Figure 9:
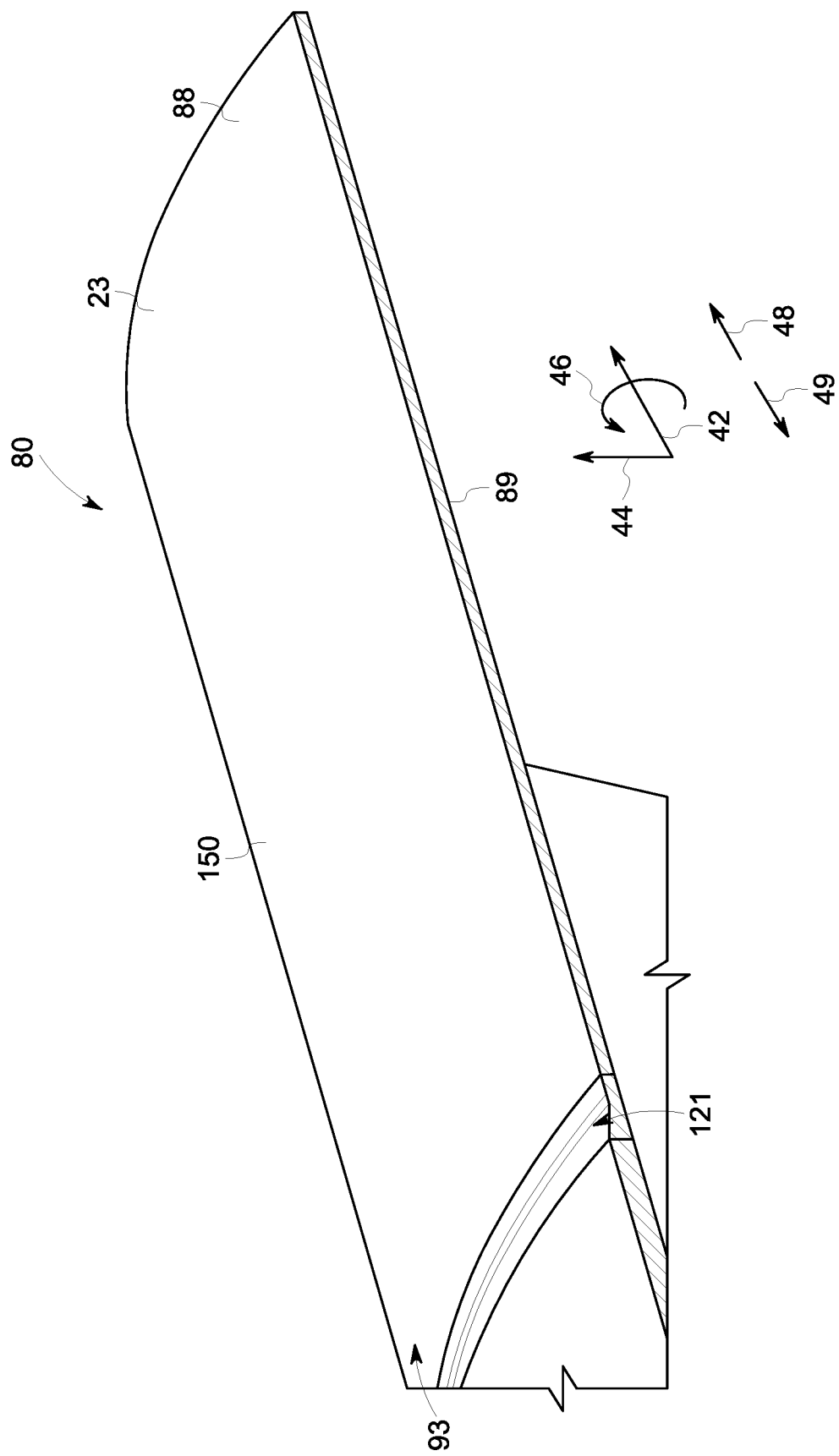
FIG. 9 is a cutaway perspective view of an embodiment of an aft end portion of the combustor liner of FIG. 2, illustrating the inlet guide and a smooth surface of the inner wall portion prior to installation of the outer wall portion (e.g., covering)

Keeping this in mind, FIG. 9 is a cutaway perspective view of the aft end portion 80 of the combustor liner 23, illustrating the inner wall portion 89 without the outer wall portion 91 (e.g., the covering 86). As shown, the external surface 88 of the aft end portion 80 of the combustor liner 80 may include the inlet guide 93 having the ramp 121 and a substantially smooth portion 150 disposed downstream 48 of the ramp 121. Particularly, the smooth portion 150 may extend substantially linearly in the axial direction 42 and curved in the circumferential direction 46. For example, the smooth portion 150 may be described as devoid of any sudden changes (e.g., protrusions, recesses, etc.) in the external surface. As discussed above, the covering 86 may be coupled (e.g., via brazing) to the smooth portion 150 of the aft end portion 80 of the combustor liner 23. In some embodiments, the combustor liner 23 may be originally manufactured (i.e., original part—new and unused) to include the smooth portion 150 and/or the ramp 121. A thickness (e.g., measured in the radial direction 44) of the smooth portion 150 of the combustor liner 23 may be approximately 0.04 to 0.2, 0.05 to 0.15, or 0.06 to 0.08 inches (or approximately 1.02 to 5.08, 1.27 to 3.81, or 1.52 to 2.03 millimeters), wherein the thickness may be substantially uniform along the length of the aft end portion 80 adjacent the ramp 121.

Figure 10:
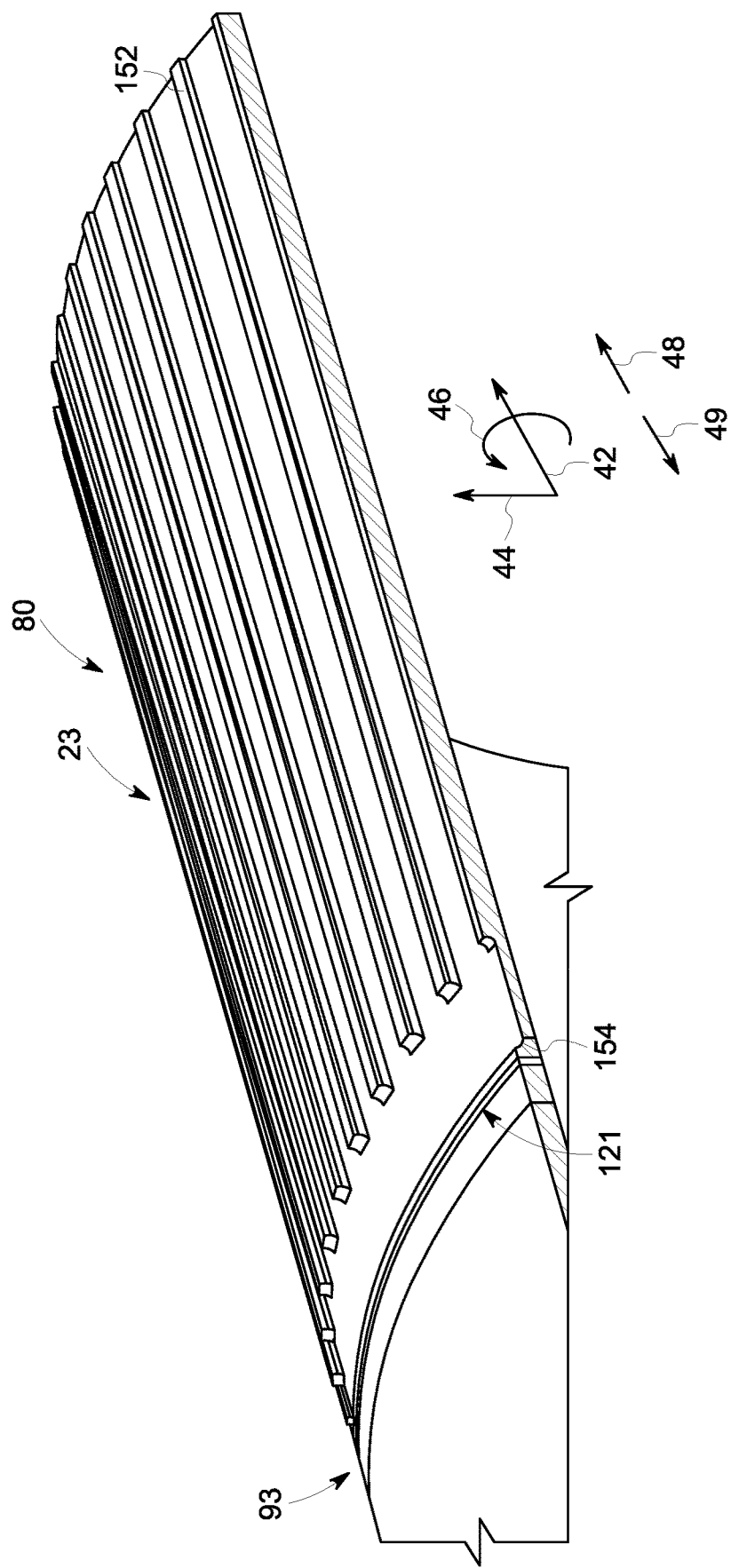
FIG. 10 is a cutaway perspective view of an embodiment of an aft end portion of the combustor liner of FIG. 2, illustrating features to be removed prior to incorporation of the inlet guide, variable microchannels, and outer wall portion (e.g., covering)

In some embodiments, however, a combustor liner 23 may be modified (e.g., retrofit) to include the smooth portion 150 and/or the ramp 121, followed by attachment of the covering 86. For example, FIG. 10 is a cutaway perspective view of the aft end portion 80 of the combustor liner 23 without the covering 86 and having additional geometry, such as ridges 152 and a fillet 154. That is, the illustrated combustor liner 23 may be manufactured to include the ridges 152 and the fillet 154 downstream of impingement cooling orifices (i.e., impinging a cooling airflow radially inward) for a particular gas turbine engine design. However, at a later time, the combustor liner 23 may be modified (e.g., retrofit by machining) to incorporate the inlet guide 93 (e.g., ramp 121 and opening 95) by removing the fillet 154 and forming the ramp 121 and removing the impingement cooling orifices and forming the opening 95, and to incorporate the channels 90 (e.g., variable microchannels) in the covering 86 by first removing the ridges 152 such that the external surface 88 of the combustor liner 23 is substantially smooth (e.g., similar to the smooth portion 150 of FIG. 9). Generally, it should be noted that the combustor liner 23 may be processed (e.g., machined) to remove any additional geometry that may be present, and to form the ramp 121 and the smooth portion 150. In this way, the covering 86 may be retrofitted to fit combustor liner 23, thereby adding the channels 90 (e.g., variable microchannels) downstream from the inlet guide 93 (e.g., ramp 121 and opening 95). Although not yet incorporated into the combustor liner 23 of FIG. 10, reference numbers 93 and 121 are included to illustrate the location for the modifications of the aft end portion 80, i.e., adding the inlet guide 93 with the ramp 121.

Figure 11:
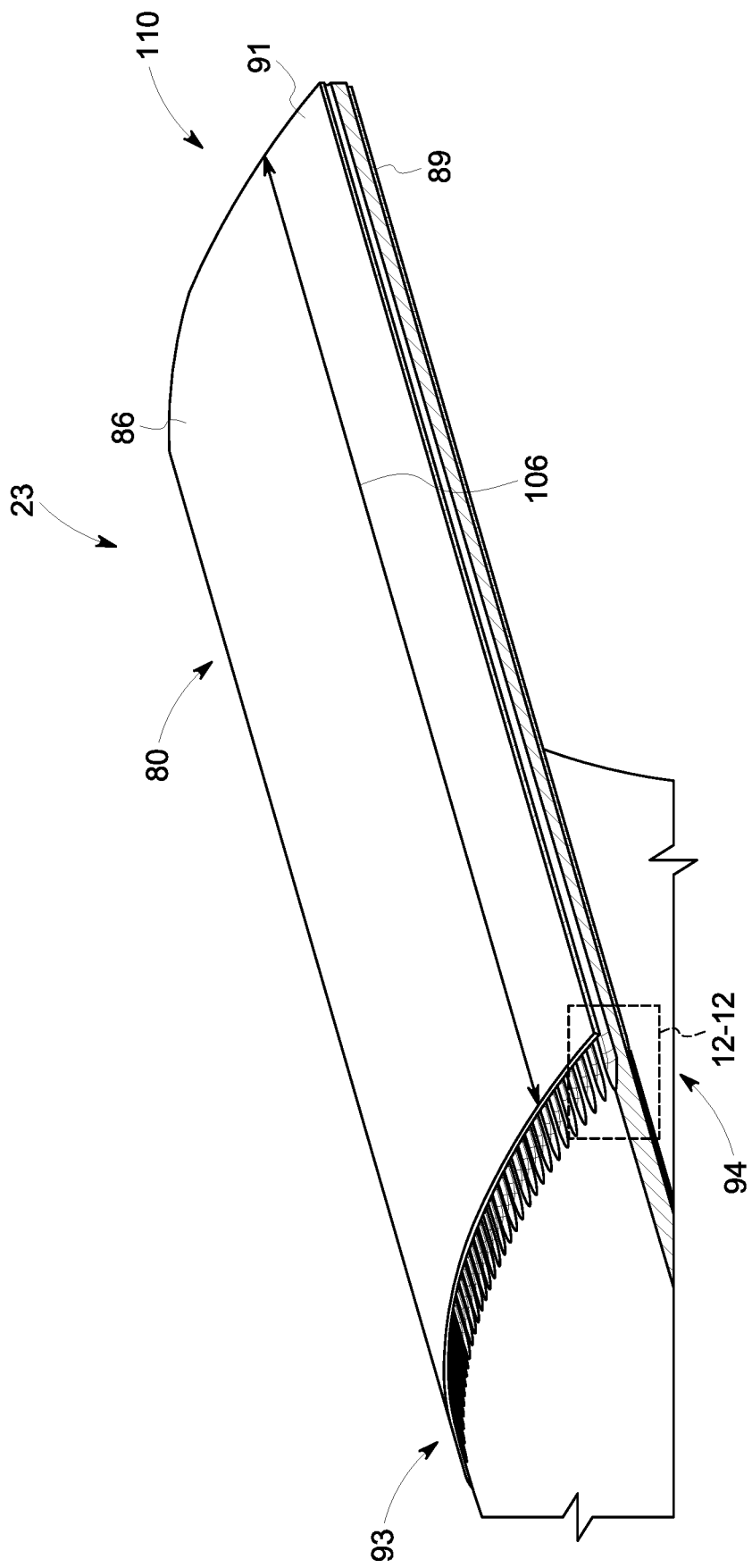
FIG. 11 is a cutaway perspective view of an embodiment of the combustor liner of the combustor of FIG. 2, illustrating variable microchannels recessed at least partially into the inner wall portion.
Figure 12:
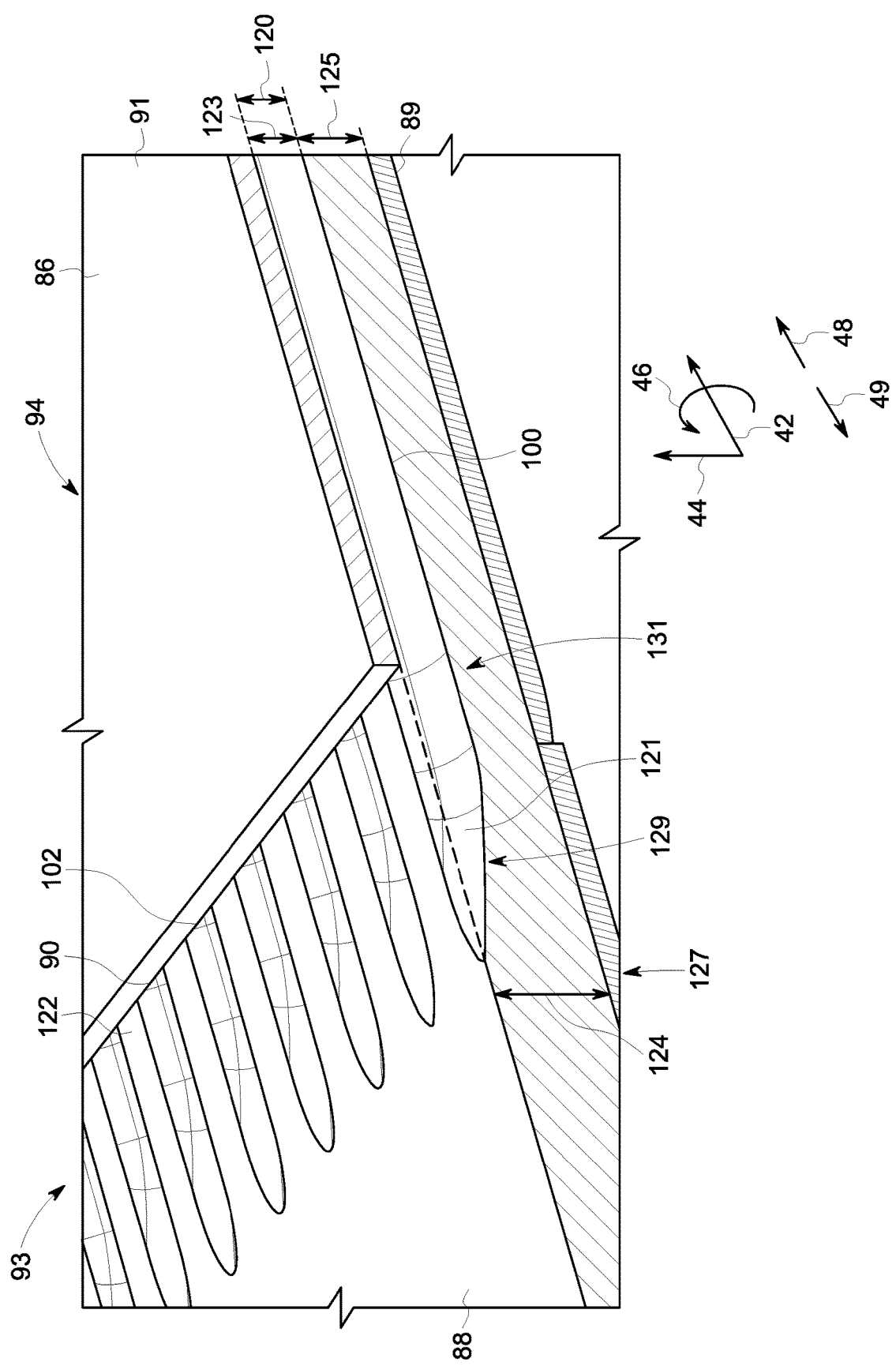
FIG. 12 is a partial cutaway perspective view of the aft end portion at the inlet guide, taken within line 12-12 of FIG. 11, illustrating details of the inlet guide and the channels at the upstream end of the outer wall portion (e.g., covering)

As mentioned above, in some embodiments, the internal surface 102 of the covering 86 may be substantially smooth or flat (e.g., no grooves 100 and protrusions 122), and the external surface 88 of the combustor liner 23 may include the grooves 100 and protrusions 122. For example, FIG. 11 is a cutaway perspective view of the aft end portion 80 of the combustor liner 23, illustrating the channels 90 (e.g., variable microchannels) between the inner wall portion 89 and the outer wall portion 91 (e.g., covering 86) with the channels 90 disposed in the inner wall portion 89. FIG. 12 is a partial cutaway perspective view of the aft end portion 80 at the inlet guide 93, taken within line 12-12 of FIG. 11, further illustrating details of the inlet guide 93 and the channels 90 at the upstream end 94 of the outer wall portion 91 (e.g., covering 86). With reference to FIGS. 11 and 12, the illustrated embodiment of the combustor liner 23 has the channels 90 (e.g., variable microchannels) defined by the internal surface 102 of the outer wall portion 91 (e.g., covering 86) and the grooves 100 recessed into the external surface 88 of the combustor liner 23. Indeed, the external surface 88 of the combustor liner 23 may also include the protrusions 122 separating the grooves 100. The grooves 100 and the protrusions 122 may have the same or substantially the same characteristics as described in detail above, for example, with reference to FIGS. 3-7, but relocated to the inner wall portion 89 rather than the outer wall portion 91 (e.g., covering 86). However, as discussed below, the ramp 121 of the inlet guide 93 may be at least partially incorporated into the upstream ends of the channels 90. The internal surface 102 of the covering 86 is substantially smooth and is directly coupled to the protrusions 122 of the combustor liner 23 along the length 106 of the covering 86. Specifically, the direct coupling (e.g., a brazed connection) of the covering 86 to the protrusions 122 along the length 106 of the covering 86 serves to confine gases (e.g., the airflow 62) to flow within the channels 90 and occludes gases from flowing within an interface between the covering 86 and the protrusions 122. In other words, an air-tight seal between edges of the channels 90 is provided, thereby preventing the airflow 62 from traveling to locations disposed radially 44 between the protrusions 122 and the combustor liner 23. In this manner, oxidation and/or corrosion of the top surfaces is avoided, thereby maintaining the connection between the covering 86 and the combustor liner 23 along the length 106 of the covering 86.

The combustor liner 23 may include the ramp(s) 121 disposed upstream 49 of the inlets 92 of the channels 90. Spatial and geometric relationships between the ramp 121, the first thickness 124, the second thickness 125, the first portion 127, the second portion 129, and the third portion 131 of the combustor liner 23 may be the same as described above in reference to FIG. 4. Further, as discussed above, the elevation change 123 of the ramp 121 (e.g., a difference between the first thickness 124 and the second thickness 125) may be approximately equal to the depth 120 of the inlet 92 to provide for a smooth transition of the airflow 62 into the inlet 92. In the current embodiment, each channel 90 may include a respective ramp 121 (e.g., a separate portion of the ramp 121) disposed upstream 49 of the channel 90, as shown. In other words, the ramps 121 may be separated in the circumferential direction 46. In some embodiments, however, the combustor liner 23 may include a ramp 121 that extends continuously and circumferentially 46 along the external surface 88 of the combustor liner 23.

Also, as described above in reference to FIGS. 3-7, the cross-sectional area, width 119, and/or depth 120 of the channels 90 may vary (e.g., decrease) along the length 106 of the combustor liner 23 from the upstream end 94 to the downstream end 110 of the outer wall portion 91 (e.g., covering 86). Indeed, as discussed above, the decrease in cross-sectional area of the channels 90 accelerates the airflow 62 along the length 106 of the covering 86 to promote heat transfer along the length 106 of the aft end portion 80 of the combustor liner 23.

Figure 13:
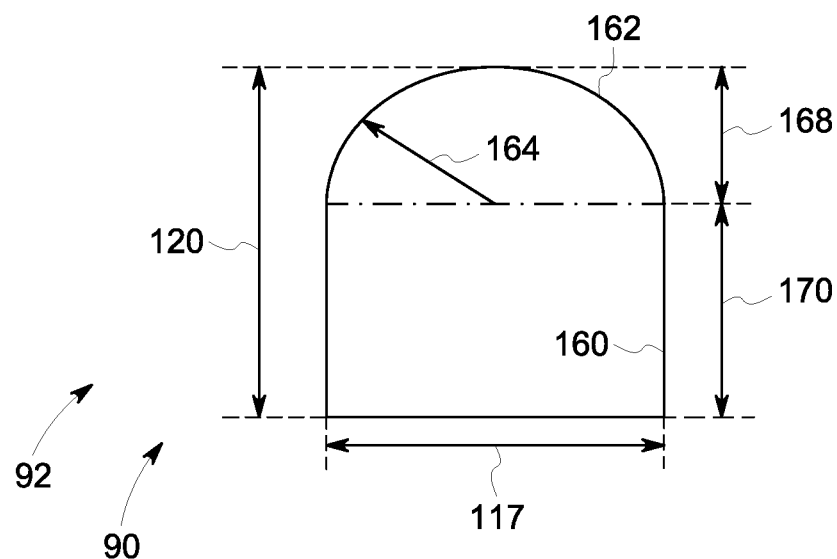
FIG. 13 is an axial schematic view of an inlet of a variable microchannel of the variable microchannel cooling of FIGS. 1-12.
Figure 14:
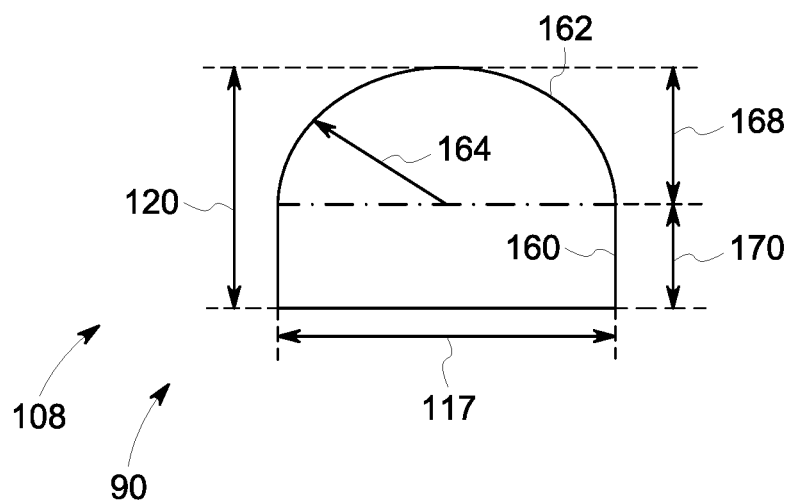
FIG. 14 is an axial schematic view of an outlet of a variable microchannel of the variable microchannel cooling of FIGS. 1-12.

To further illustrate, FIG. 13 is a schematic axial view of the inlet 92 of the channel 90 and FIG. 14 is a schematic axial view of the outlet 108 of the channel 90. FIGS. 13 and 14 may now be discussed in parallel. As shown, the channel 90 may include a rectilinear or rectangular portion 160 and a curved or arcuate portion 162. In some embodiments, the curved portion 162 may be a semicircle having a radius 164 substantially equal to half of a width 117 of the channel 90. In this manner, a transition 164 between the rectilinear portion 160 and the curved portion 162 may be substantially round (e.g., does not include corners) to provide for improved fluid flow and reduced stress. The radius 164 and the width 117 each may be uniform or variable (e.g., decreasing in a linear or non-linear manner) from the inlet 92 to the outlet 108. In certain embodiments, the radius 164 may be approximately half of the width 117, which may be less than or equal to approximately 0.1, 0.09, 0.08, 0.07, 0.06, 0.05, 0.04, or 0.03 inches (or less than or equal to approximately 2.54, 2.29, 2.03, 1.78, 1.52, 1.27, 1.02, or 0.76 millimeters) at the inlet 92, the outlet 108, and therebetween. Furthermore, the radius 164 and/or the width 117 may vary (e.g., decrease in a linear or non-linear manner) by an amount at least equal to or greater than approximately 10, 20, 30, 40, 50, 60, 70, 80, or 90, percent from the inlet 92 to the outlet 108.

Additionally, as discussed above, the channel 90 may vary (e.g., decrease in a linear or non-linear manner) in depth 120 from the inlet 94 to the outlet 108. In the illustrated embodiment of FIGS. 13 and 14, the depth 120 of the channel 90 is equal to the sum of a first height 168 of the curved portion 162 (which may be equal to the radius 164) and a second height 170 of the rectilinear portion 160. As the depth 120 varies (e.g., decreases) from the inlet 94 to the outlet 108, the first height 168 may remain constant while the second height 170 decreases, the first height 168 may decrease while the second height 170 remains constant, or the first height 168 and the second height 170 may both vary (e.g., decrease). Furthermore, as the depth 120 varies, the radius 164 and/or the width 117 may also vary (e.g., decrease) along the channel 90 from the inlet 92 to the outlet 108. In embodiments with a constant radius 164, width 117, and/or first height 168, the geometry (e.g., semi-circular shape) of the curved portion 162 may be maintained along the entire length of the channel 90. In certain embodiments, as discussed above, the ratio of the first height 168 relative to the second height 170 of the depth 120 may be constant or variable (e.g., increasing or decreasing) along the length of the channel 90. Furthermore, the ratio of the depth 120 relative to the width 117 may be variable (e.g., increasing or decreasing) along the length of the channel 90. As discussed above, the depth 120 may be less than or equal to approximately 0.1, 0.09, 0.08, 0.07, 0.06, 0.05, 0.04, or 0.03 inches (or less than or equal to approximately 2.54, 2.29, 2.03, 1.78, 1.52, 1.27, 1.02, or 0.76 millimeters) at the inlet 92, the outlet 108, and therebetween. Overall, each channel 90 (e.g., variable microchannel) may change in cross-sectional area, geometry (e.g., rectilinear and curved portions 160 and 162), width 117, and height 120 along the length of the channel 90 from the inlet 92 to the outlet 108 by a suitable amount to increase convective heat transfer for cooling the aft end portion 80 of the combustor liner 23.

Technical effects of the invention include a system and method for providing microchannels at an aft end of a combustor liner for cooling purposes. For example, the disclosed embodiments include microchannels defined by spaces disposed between the combustor liner and a covering disposed about an aft end of the combustor liner. The combustor liner further includes an inlet guide (e.g., ramp and opening) disposed upstream of the microchannels configured to guide an airflow toward the microchannels in an axial direction. In this manner, impingement cooling on the surface of the combustor liner is avoided, and cooling along a length of the aft end of the combustor liner is improved. Further, the covering is directly coupled to combustor liner along a length of the combustor liner, thereby ensuring an airtight seal along the microchannels and preventing an airflow from seeping into an interface between the combustor liner and the covering. In this way, oxidation/corrosion of the interface between the combustor liner and the covering is avoided, thereby enhancing a cooling effectiveness of the airflow as it flows within the channels. Further still, a cross-sectional area of the microchannels may decrease from an inlet to an outlet of the channels, relative to the direction of the airflow. In this manner, the airflow is accelerated as it travels from the inlet to the outlet, thereby enhancing the cooling effectiveness of the airflow.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 a combustor liner disposed about a combustion chamber of a combustor of a gas turbine system, wherein the combustor is configured to surround an aft end portion of the combustor liner with an upstream end portion of a transition piece, the combustor is configured to surround the combustor liner and the transition piece with a flow sleeve to define an intermediate flow passage, the intermediate flow passage is configured to direct a flow in an upstream direction relative to a downstream direction of a main flow of combustion gas through the combustor, and the aft end portion of the combustor liner comprises:
  an inner wall portion exposed to the combustion chamber;
  an outer wall portion disposed about the inner wall portion; and
  a plurality of channels between the inner and outer wall portions of the combustor liner, wherein each channel of the plurality of channels is configured to direct a coolant flow in a flow direction along the combustor liner to convectively cool the combustor liner between an inlet and an outlet of the respective channel of the plurality of channels, the flow direction is oriented in the downstream direction of the main flow of combustion gas through the combustor, the inner and outer wall portions define the plurality of channels between the inlet and the outlet of each channel of the plurality of channels, each channel of the plurality of channels is recessed into a radially inner surface of the outer wall portion, the inlet of each channel of the plurality of channels is disposed in an axially facing surface at an upstream axial terminal end of the outer wall portion relative to the coolant flow, the outer wall portion terminates at the upstream axial terminal end, and each channel of the plurality of channels extends axially downstream of the inlet at a radial depth less than a radial thickness of the outer wall portion; and
 an inlet guide disposed directly upstream from the inlets of the plurality of channels and the upstream axial terminal end of the outer wall portion, wherein the inlet guide comprises:
  a ramp in the inner wall portion of the combustor liner and extending circumferentially about a central axis of the combustor liner about an entire circumference of the combustor liner, wherein the ramp comprises an angled surface having an angle defined by a decreasing thickness of the inner wall portion from a first thickness to a second thickness in the downstream direction toward the inlets of the plurality of channels; and
  an opening extending circumferentially about the entire circumference of the combustor liner along the ramp within the intermediate flow passage between the combustor liner and the flow sleeve;
 wherein the combustor excludes radial impingement openings directed radially inward toward a flow path of the coolant flow over an axial distance along the ramp, into the inlets, and through the plurality of channels; and
 wherein a surface of the inner wall portion facing the combustion chamber is at a single, constant radial distance with respect to the central axis of the combustor liner over the axial distance along the ramp, into the inlets, and through the plurality of channels.

2. The system of claim 1, wherein the inner and outer wall portions are integral portions of a one-piece structure.

3. The system of claim 1, wherein each pair of adjacent channels of the plurality of channels is separated by a protrusion extending lengthwise along the respective pair of adjacent channels, wherein the outer wall portion comprises a covering coupled to the inner wall portion via a thermally conductive bond to form an air-tight seal along the protrusion between each pair of adjacent channels along an entire axial length of the covering.

4. The system of claim 1, wherein each channel of the plurality of channels comprises a cross-sectional area having a rectangular portion and an arcuate portion, wherein the cross-sectional area of each channel of the plurality of channels decreases in the flow direction from the inlet to the outlet of each channel of the plurality of channels.

5. The system of claim 1, wherein each channel of the plurality of channels includes a cross-sectional area that progressively changes along a length of each channel of the plurality of channels.

6. The system of claim 1, wherein each channel of the plurality of channels is recessed into the radially inner surface of the outer wall portion along an entire axial length of the outer wall portion.

7. The system of claim 1, comprising the transition piece, the flow sleeve, and the intermediate flow passage, wherein the angle is less than or equal to 30 degrees, and an elevation change of the ramp between the first and second thicknesses is substantially equal to a depth of the inlets.

8. The system of claim 1, wherein the outer wall portion comprises a pre-sintered preform (PSP) sheet bonded to the inner wall portion via a thermally conductive bond along an entire axial length of the PSP sheet between the plurality of channels, the PSP sheet has a thickness of 1.27 to 5.08 millimeters, each channel of the plurality of channels is recessed into the radially inner surface of the PSP sheet, and a maximum depth of each channel of the plurality of channels is at least 50 percent of the thickness of the PSP sheet.

9. The system of claim 1, wherein each channel of the plurality of channels is a microchannel having a depth, a width, and a cross-sectional area, wherein the depth and the width are each less than or equal to approximately 2.54 millimeters, wherein the cross-sectional area is less than or equal to approximately 6.45 square millimeters.

10. The system of claim 5, wherein the cross-sectional area of each channel of the plurality of channels decreases along the length from the inlet to the outlet of each channel of the plurality of channels, and a peak-to-peak distance between each pair of adjacent channels of the plurality of channels is less than or equal to approximately 5.08 millimeters.

11. The system of claim 1, comprising the gas turbine system having a turbine and the combustor with the combustor liner, the transition piece, and the flow sleeve, wherein a seal is disposed between the aft end portion of the combustor liner and the upstream end portion of the transition piece, wherein a downstream end portion of the transition piece is configured to output the combustion gas to the turbine.

12. A system, comprising:
a combustor liner disposed about a combustion chamber of a combustor of a gas turbine system, wherein the combustor is configured to surround an aft end portion of the combustor liner with an upstream end portion of a transition piece, the combustor is configured to surround the combustor liner and the transition piece with a flow sleeve to define an intermediate flow passage, the intermediate flow passage is configured to direct a flow in an upstream direction relative to a downstream direction of a main flow of combustion gas through the combustor, and the aft end portion of the combustor liner comprises:
an inner wall portion exposed to the combustion chamber;
an outer wall portion disposed about the inner wall portion, wherein the outer wall portion terminates at an upstream axial terminal end relative to a coolant flow along the combustor liner; and
a plurality of channels between the inner and outer wall portions of the combustor liner, wherein each channel of the plurality of channels is configured to direct the coolant flow in a flow direction along the combustor liner to convectively cool the combustor liner, wherein each channel of the plurality of channels comprises a microchannel having a cross-sectional area of less than or equal to approximately 6.45 square millimeters, wherein the cross-sectional area of each channel of the plurality of channels decreases in the flow direction from an inlet to an outlet of each channel of the plurality of channels, the inlet of each channel of the plurality of channels is disposed at the upstream axial terminal end of the outer wall portion, each channel of the plurality of channels intakes the coolant flow only in an axial direction via the inlet of the respective channel, the inner and outer wall portions define the plurality of channels between respective inlets and outlets of the plurality of channels, and the outer wall portion comprises a pre-sintered preform (PSP) sheet bonded to the inner wall portion via a thermally conductive bond along an entire axial length of the PSP sheet between the plurality of channels, wherein the plurality of channels are configured as
each channel of the plurality of channels is recessed into a radially inner surface of the outer wall portion, wherein the inlet of each channel of the plurality of channels is disposed at the upstream axial terminal end of the outer wall portion, and each channel of the plurality of channels extends axially downstream of the inlet at a radial depth less than a radial thickness of the outer wall portion;
an inlet guide disposed directly upstream from the inlets of the plurality of channels and the upstream axial terminal end of the outer wall portion, wherein the inlet guide comprises:
a ramp in the inner wall portion of the combustor liner and extending circumferentially about a central axis of the combustor liner about an entire circumference of the combustor liner, wherein the ramp comprises an angled surface having an angle defined by a decreasing thickness of the inner wall portion from a first thickness to a second thickness in the downstream direction toward the inlets of the plurality of channels; and
an opening extending circumferentially about the entire circumference of the combustor liner along the ramp within the intermediate flow passage between the combustor liner and the flow sleeve;
wherein the combustor excludes radial impingement openings directed radially inward toward a flow path of the coolant flow over an axial distance along the ramp, into the inlets, and through the plurality of channels,
wherein the ramp is formed directly in the inner wall portion of the combustor liner adjacent the inlets,
wherein a surface of the inner wall portion facing the combustion chamber is at a single, constant radial distance with respect to the central axis of the combustor liner over the axial distance along the ramp, into the inlets, and through the plurality of channels.

13. The system of claim 12, comprising the gas turbine system having a turbine and the combustor with the combustor liner, the transition piece, the flow sleeve, and the intermediate flow passage, wherein a seal is disposed between the aft end portion of the combustor liner and the upstream end portion of the transition piece, wherein a downstream end portion of the transition piece is configured to output the combustion gas to the turbine, wherein the flow direction of the coolant flow is oriented in the downstream direction of the main flow of combustion gas through the combustor, wherein the opening and the ramp are configured to reverse flow directions from the flow through the intermediate flow passage in the upstream direction to the coolant flow through the plurality of channels in the downstream direction.

14. The system of claim 12, wherein each channel of the plurality of channels has a depth and a width each less than or equal to approximately 2.54 millimeters, and a peak-to-peak distance between each pair of adjacent channels of the plurality of channels is less than or equal to approximately 5.08 millimeters.

15. The system of claim 12, wherein an elevation change of the ramp between the first and second thicknesses is substantially equal to a depth of the inlets.

16. The system of claim 12, wherein the PSP sheet has a thickness of 1.27 to 5.08 millimeters, a maximum depth of each channel of the plurality of channels is at least 50 percent of the thickness of the PSP sheet, and the thickness of the PSP sheet is substantially uniform along the entire axial length.

* * * * *